US012561339B2

(12) United States Patent
Baker et al.

(10) Patent No.: US 12,561,339 B2
(45) Date of Patent: Feb. 24, 2026

(54) PROVIDING A UNIFIED QUERY INTERFACE ACROSS MULTIPLE ONTOLOGY-BASED DATABASES

(71) Applicant: Palantir Technologies Inc., Denver, CO (US)

(72) Inventors: James Baker, Maidenhead (GB); Xavier Falco, London (GB); Samuel Flavio Barroso Souza, London (GB); Helen Yu, New York, NY (US); Amr Al Mallah, Tacoma, WA (US); Yixun Xu, Jersey City, NJ (US); Arseny Bogomolov, Arlington, VA (US); Slawomir Mucha, London (GB); Pawel Adamowicz, London (GB)

(73) Assignee: Palantir Technologies Inc., Denver, CO (US)

( * ) Notice: Subject to any disclaimer, the term of this patent is extended or adjusted under 35 U.S.C. 154(b) by 68 days.

(21) Appl. No.: 18/744,290

(22) Filed: Jun. 14, 2024

(65) Prior Publication Data

US 2025/0328541 A1 Oct. 23, 2025

Related U.S. Application Data

(60) Provisional application No. 63/637,310, filed on Apr. 22, 2024.

(51) Int. Cl.
*G06F 16/25* (2019.01)
*G06F 9/54* (2006.01)
(Continued)

(52) U.S. Cl.
CPC .............. *G06F 16/25* (2019.01); *G06F 9/547* (2013.01); *G06F 16/9024* (2019.01); *G06F 21/6218* (2013.01)

(58) Field of Classification Search
CPC ... G06F 16/25; G06F 16/9024; G06F 21/6218
See application file for complete search history.

(56) References Cited

U.S. PATENT DOCUMENTS 6,988,109 B2 1/2006 Stanley et al.
8,015,143 B2 9/2011 Estes
(Continued)

OTHER PUBLICATIONS

U.S. Appl. No. 18/642,456, Non-Final Office Action, Feb. 21, 2025.
(Continued)

*Primary Examiner* — Hee Soo Kim
(74) *Attorney, Agent, or Firm* — Duane Morris LLP

(57) ABSTRACT

A system for providing a unified query interface across multiple ontology-based databases and related methods are disclosed. The system is programmed to receive calls to an application programming interface for querying an ontology, where ontology data is represented in different databases respectively in different forms. For each function being called, system is programmed to select a database from the different databases based on the function type and each ontology entity type being processed by the function. The system is further programmed to retrieve data from each selected database, merge the retrieval results as appropriate, and transform the final result to ontology data in response to the calls.

20 Claims, 16 Drawing Sheets

(51) Int. Cl.
  *G06F 16/901*   (2019.01)
  *G06F 21/62*   (2013.01)

(56)     References Cited

U.S. PATENT DOCUMENTS

| | | | |
|---|---|---|---|
| 9,569,070 | B1 | 2/2017 | Ma et al. |
| 9,626,158 | B1 | 4/2017 | Ben-Tzur |
| 9,712,576 | B1 | 7/2017 | Gill |
| 10,789,263 | B2 | 9/2020 | Beard et al. |
| 10,803,106 | B1 | 10/2020 | Beard et al. |
| 11,816,156 | B2 | 11/2023 | Tonkin |
| 2006/0165040 | A1 | 7/2006 | Rathod et al. |
| 2008/0086498 | A1 | 4/2008 | Sureka |
| 2012/0016849 | A1 | 1/2012 | Garrod et al. |
| 2012/0197934 | A1 | 8/2012 | Zhang et al. |
| 2014/0108461 | A1 | 4/2014 | B'Far et al. |
| 2014/0156638 | A1 | 6/2014 | Joshi et al. |
| 2015/0227598 | A1 | 8/2015 | Hahn et al. |
| 2015/0293955 | A1 | 10/2015 | Dickey |
| 2016/0085515 | A1* | 3/2016 | Ben-Tzur ................. G06F 8/34 717/109 |
| 2016/0085516 | A1 | 3/2016 | Ben-Tzur et al. |
| 2016/0110408 | A1 | 4/2016 | Madhavarapu et al. |
| 2016/0224600 | A1 | 8/2016 | Munk |
| 2016/0255139 | A1 | 9/2016 | Rathod |
| 2016/0301753 | A1 | 10/2016 | Auch et al. |
| 2017/0193021 | A1 | 7/2017 | Deng et al. |
| 2017/0235848 | A1* | 8/2017 | Van Dusen ........ G06Q 30/0201 705/12 |
| 2018/0027006 | A1* | 1/2018 | Zimmermann ..... H04L 63/0227 726/11 |
| 2019/0102430 | A1* | 4/2019 | Wang ....................... G06N 7/01 |
| 2019/0347343 | A1 | 11/2019 | Fink et al. |
| 2020/0311070 | A1* | 10/2020 | Yan ....................... G06N 20/00 |
| 2021/0034614 | A1 | 2/2021 | Kothari et al. |
| 2021/0209249 | A1 | 7/2021 | Hoffer |
| 2023/0334080 | A1* | 10/2023 | Tonkin ................... G06N 5/022 |
| 2024/0296181 | A1 | 9/2024 | Busany et al. |
| 2024/0354326 | A1 | 10/2024 | Baker et al. |
| 2024/0354567 | A1 | 10/2024 | Duggal et al. |

OTHER PUBLICATIONS

U.S. Appl. No. 18/440,724, filed Feb. 13, 2024.
U.S. Appl. No. 18/542,456, filed Apr. 22, 2024.
U.S. Appl. No. 18/642,459, filed Apr. 22, 2024.
U.S. Appl. No. 18/642,464, filed Apr. 22, 2024.

U.S. Appl. No. 18/769,002, filed Jul. 10, 2024.
U.S. Appl. No. 18/440,724, Non-Final Office Action, Aug. 28, 2024.
U.S. Appl. No. 18/642,464, Notice of Allowance, Apr. 4, 2025.
Anonymous: "Overview—Palantir Foundry", Jan. 31, 2023 (Jan. 31, 2023), pp. 1-4, XP093205277, Retrieved from the Internet: URL: https://web.archive.org/web/20230131034452/https://www.palantir.com/docs/foundry/platform-overview/overview/.
Anonymous: "Data integration Overview—Palantir", May 18, 2022 (May 18, 2022), pp. 1-2, XP093205977, Retrieved from the Internet: URL: https://web.archive.org/web/20220518064333/https://www.palantir.com/docs/foundry/data-integration/overview/.
Higgins Andrew et al.: "How Palantir Foundry Helps Customers Build and Deploy AI-Powered Decision-Making Applications I AWS Partner Network (APN) Blog", Apr. 12, 2022 (Apr. 12, 2022), pp. 1-10, XP093205395, Retrieved from the Internet: URL: https://web.archive.org/web/20220412042602mp_/https://aws.amazon.com/blogs/apn/how-palantir-foundry-helps-customers-build-and-deploy-ai-powered-decision-making-applications/.
Anonymous: "Object Storage V1 (Phonograph)—Palantir", Jan. 29, 2023 (Jan. 29, 2023), pp. 1-3, XP093209496, Retrieved from the Internet: URL: https://web.archive.org/web/20230129030331/https://www.palantir.com/docs/foundry/ontology-manager/object-storage-v1/.
Anonymous: "Save changes to the Ontology—Palantir", May 23, 2022 (May 23, 2022), pp. 1-4, XP093205386, Retrieved from the Internet: URL: https://web.archive.org/web/20220523050510/https://www.palantir.com/docs/foundry/ontology-manager/save-changes/.
Anonymous: "Permissions—Palantir Foundry", May 21, 2022 (May 21, 2022), pp. 1-6, XP093205376, Retrieved from the Internet: URL: https://web.archive.org/web/20220521182741/https://www.palantir.com/docs/foundry/ontology-manager/permissions/.
Extended European Search Report in EP Application No. 24171562.2, dated Oct. 14, 2024, in 17 pages.
Extended European Search Report in EP Application No. 24171618.2, dated Oct. 14, 2024, in 15 pages.
Extended European Search Report in EP Application No. 24171617.4, dated Oct. 14, 2024, in 15 pages.
Extended European Search Report in EP Application No. 25170785.7, dated Sep. 22, 2025, 14 pages.
Extended European Search Report in EP Application No. 25170786.5, dated Sep. 24, 2025, 8 pages.
Sethi, Raghav, et al. "Presto: SQL on everything." 2019 IEEE 35th International Conference on Data Engineering (ICDE), https://doi.org/10.1109/icde.2019.00196, Apr. 2019, 12 pages.
U.S. Appl. No. 19/286,033, filed Jul. 30, 2025.
U.S. Appl. No. 19/329,378, filed Sep. 15, 2025.

\* cited by examiner

| Time | Current datasource row state | User edit | Final object state |
|---|---|---|---|
| T0 | columns = {<br>pk_column = pk1,<br>col1 = val1,<br>col2 = val2} | | properties = {<br>pk_column = pk1,<br>col1 = val1,<br>col2 = val2},<br>deleted = false |
| T1 | columns = {} | | properties = {},<br>deleted = true |
| T2 | columns = {<br>pk_column = pk1,<br>col1 = val1,<br>col2 = val2} | | properties = {<br>pk_column = pk1,<br>col1 = val1,<br>col2 = val2},<br>deleted = false |
| T3 | columns = {<br>pk_column = pk1,<br>col1 = val1,<br>col2 = val2} | Modify object:<br>properties = {<br>pk_column = pk1,<br>col2 = newVal2} | properties = {<br>pk_column = pk1,<br>col1 = val1,<br>col2 = newVal2},<br>deleted = false |
| T4 | columns = {} | | properties = {},<br>deleted = true |
| T5 | columns = {<br>pk_column = pk1,<br>col1 = val1,<br>col2 = val2} | | properties = {<br>pk_column = pk1,<br>col1 = val1,<br>col2 = newVal2},<br>deleted = false |
| T6 | columns = {<br>pk_column = pk1,<br>col1 = newVal1,<br>col2 = val2} | | properties = {<br>pk_column = pk1,<br>col1 = newVal1,<br>col2 = newVal2},<br>deleted = false |

FIG. 5A

| Time | Current datasource row state | User edit | Final object state |
|---|---|---|---|
| T7 | columns = {<br>pk_column = pk1,<br>col1 = newVal1,<br>col2 = val2} | Delete object | properties = {},<br>deleted = true |
| T8 | columns = {<br>pk_column = pk1,<br>col1 = newVal1,<br>col2 = val2,<br>col3 = null} | | properties = {},<br>deleted = true |
| T9 | columns = {<br>pk_column = pk1,<br>col1 = newVal1,<br>col2 = val2,<br>col3 = null} | Create object:<br>properties = {<br>pk_column = pk1,<br>col3 = val3} | properties = {<br>pk_column = pk1,<br>col1 = null,<br>col2 = null,<br>col3 = val3},<br>deleted = false |
| T10 | columns = {<br>pk_column = pk1,<br>col1 = newVal1,<br>col2 = newVal2,<br>col3 = newVal3} | | properties = {<br>pk_column = pk1,<br>col1 = null,<br>col2 = null,<br>col3 = val3},<br>deleted = false |
| T11 | columns = {<br>pk_column = pk1,<br>col1 = newVal1,<br>col2 = newVal2,<br>col3 = newVal3} | Modify object:<br>properties = {<br>pk_column = pk1,<br>col2 = newVal22} | properties = {<br>pk_column = pk1,<br>col1 = null,<br>col2 = newVal22,<br>col3 = val3},<br>deleted = false |
| T12 | columns = {} | | properties = {<br>pk_column = pk1,<br>col1 = null,<br>col2 = newVal22,<br>col3 = val3},<br>deleted = false |

FIG. 5B

| Time | Current datasource row state | User edit | Final object state |
|------|------------------------------|-----------|--------------------|
| T13 | columns = {<br>pk_column = pk1,<br>col1 = newVal1,<br>col2 = newVal2,<br>col3 = newVal3} | Delete object | properties = {},<br>deleted = true |
| T14 | columns = {<br>pk_column = pk1, col1 =<br>newVal1,<br>col2 = newVal2,<br>col3 = newVal3} | Modify object: properties<br>= {<br>pk_column = pk1, col2 =<br>newVal2, col3 = val3} | properties = {},<br>deleted = true |

FIG. 5C

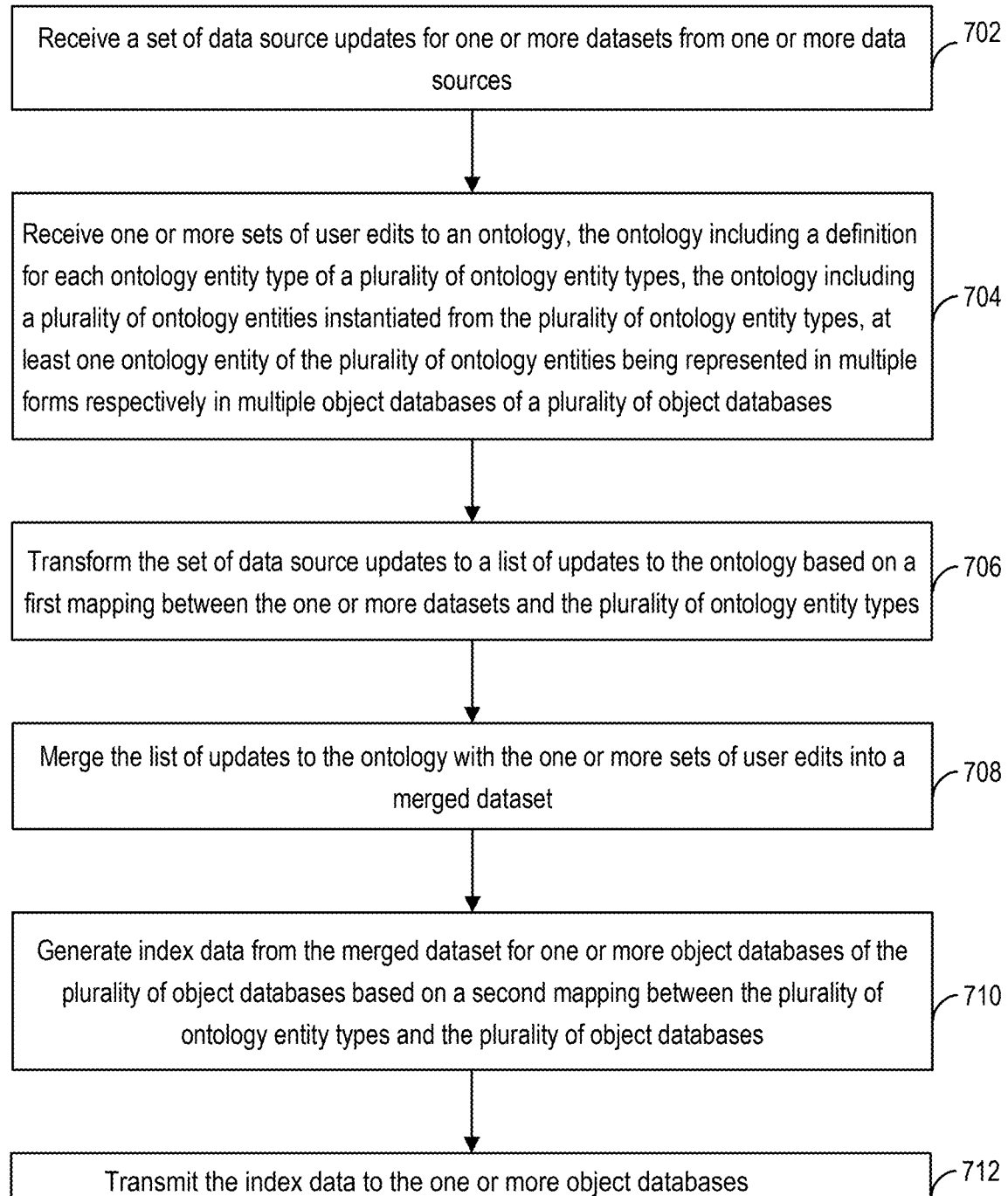

Receive a set of data source updates for one or more datasets from one or more data sources ⌐702

Receive one or more sets of user edits to an ontology, the ontology including a definition for each ontology entity type of a plurality of ontology entity types, the ontology including a plurality of ontology entities instantiated from the plurality of ontology entity types, at least one ontology entity of the plurality of ontology entities being represented in multiple forms respectively in multiple object databases of a plurality of object databases ⌐704

Transform the set of data source updates to a list of updates to the ontology based on a first mapping between the one or more datasets and the plurality of ontology entity types ⌐706

Merge the list of updates to the ontology with the one or more sets of user edits into a merged dataset ⌐708

Generate index data from the merged dataset for one or more object databases of the plurality of object databases based on a second mapping between the plurality of ontology entity types and the plurality of object databases ⌐710

Transmit the index data to the one or more object databases ⌐712

FIG. 7

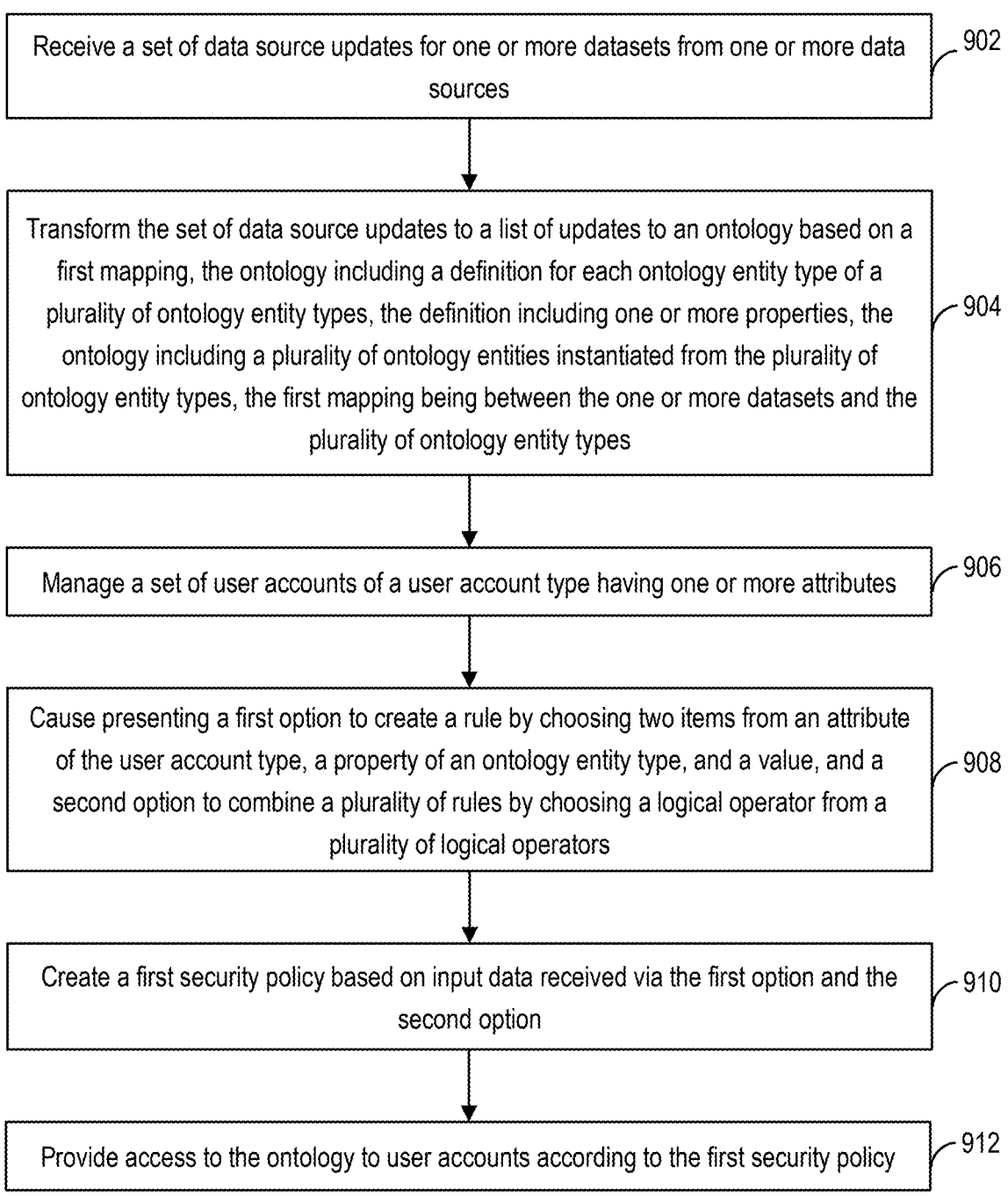

Receive a set of data source updates for one or more datasets from one or more data sources ⟋902

Transform the set of data source updates to a list of updates to an ontology based on a first mapping, the ontology including a definition for each ontology entity type of a plurality of ontology entity types, the definition including one or more properties, the ontology including a plurality of ontology entities instantiated from the plurality of ontology entity types, the first mapping being between the one or more datasets and the plurality of ontology entity types ⟋904

Manage a set of user accounts of a user account type having one or more attributes ⟋906

Cause presenting a first option to create a rule by choosing two items from an attribute of the user account type, a property of an ontology entity type, and a value, and a second option to combine a plurality of rules by choosing a logical operator from a plurality of logical operators ⟋908

Create a first security policy based on input data received via the first option and the second option ⟋910

Provide access to the ontology to user accounts according to the first security policy ⟋912

FIG. 9

| Time | Database 1 | Database 2 | Avail1 | Avail2 | Read Req | Write Req |
|------|-----------|-----------|--------|--------|----------|-----------|
| T0 | V0 | V0 | V0 | V0 | | W1, V1 |
| T1 | V0,V1 | V0 | V0 | V1(0) | R1 | W2, V2 |
| T2 | V0,V1 | V0,V1 | V1 | V1 | | |
| T3 | V0-V2 | V0,V1 | V1 | V2(0) | R2 | W3, V3 |
| T4 | V0-V2 | V0,V1,V3 | V1 | V3(0) | | |
| T5 | V0-V2 | V0,V1,V3 | V1 | V3(1) | R3 | W4, V4 |
| T6 | V0-V4 | V0,V1,V3 | | | | |

FIG. 10

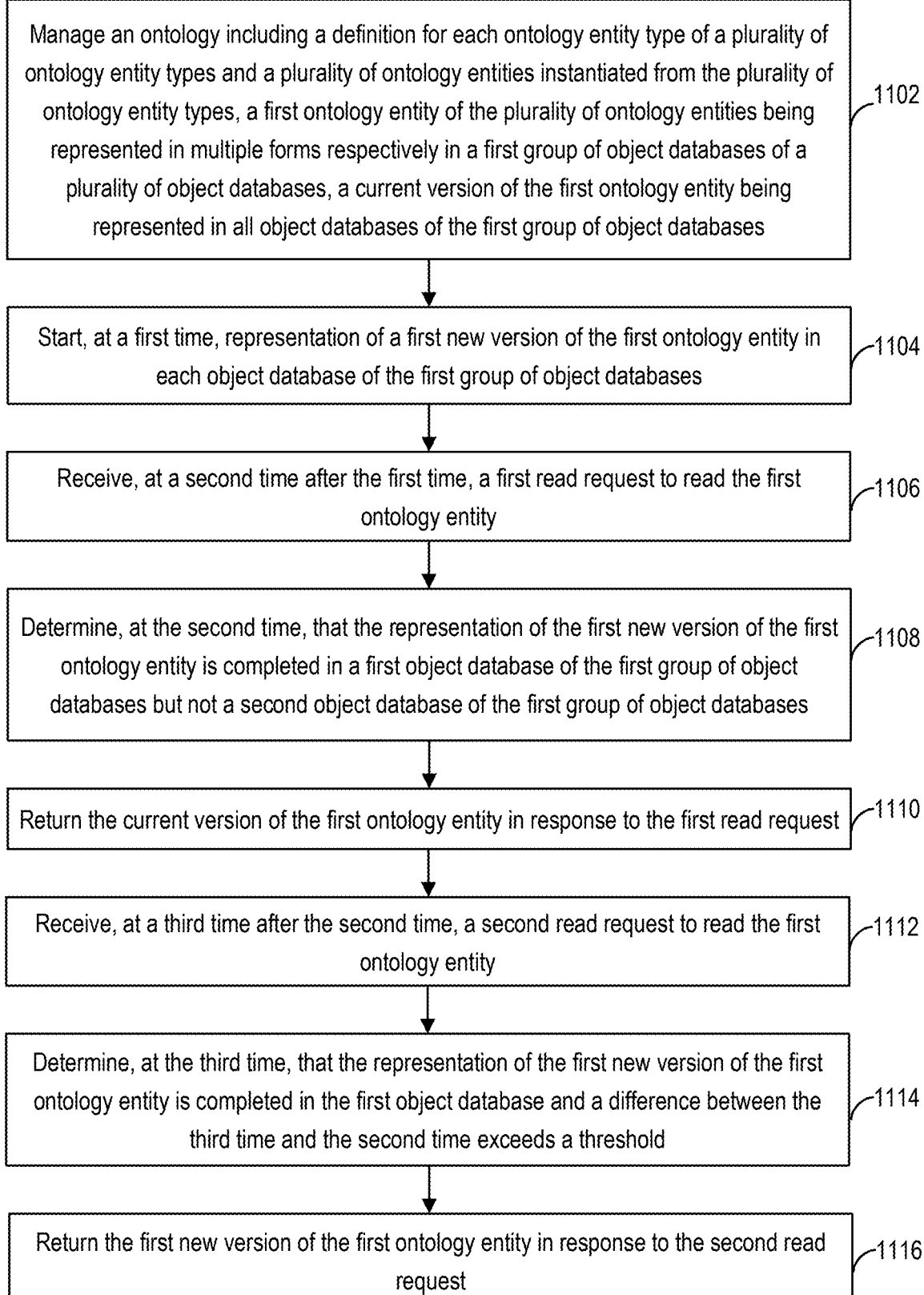

Manage an ontology including a definition for each ontology entity type of a plurality of ontology entity types and a plurality of ontology entities instantiated from the plurality of ontology entity types, a first ontology entity of the plurality of ontology entities being represented in multiple forms respectively in a first group of object databases of a plurality of object databases, a current version of the first ontology entity being represented in all object databases of the first group of object databases ⟋1102

Start, at a first time, representation of a first new version of the first ontology entity in each object database of the first group of object databases ⟋1104

Receive, at a second time after the first time, a first read request to read the first ontology entity ⟋1106

Determine, at the second time, that the representation of the first new version of the first ontology entity is completed in a first object database of the first group of object databases but not a second object database of the first group of object databases ⟋1108

Return the current version of the first ontology entity in response to the first read request ⟋1110

Receive, at a third time after the second time, a second read request to read the first ontology entity ⟋1112

Determine, at the third time, that the representation of the first new version of the first ontology entity is completed in the first object database and a difference between the third time and the second time exceeds a threshold ⟋1114

Return the first new version of the first ontology entity in response to the second read request ⟋1116

FIG. 11

```
1202
const passengersDepartingFromAirport = Objects.search()
  .flights()
  .filter(flight => flight.departureAirportCode.exactMatch(airportCode))
  .searchAroundPassengers();
```

```
1204
const passengersDepartingFromAirport = Objects.search()
  .buildings()
  .filter(building => Filters.and(
      building.maxOccupancy.gt(100),
      building.inFloodZone.isTrue()
  ))
```

FIG. 12

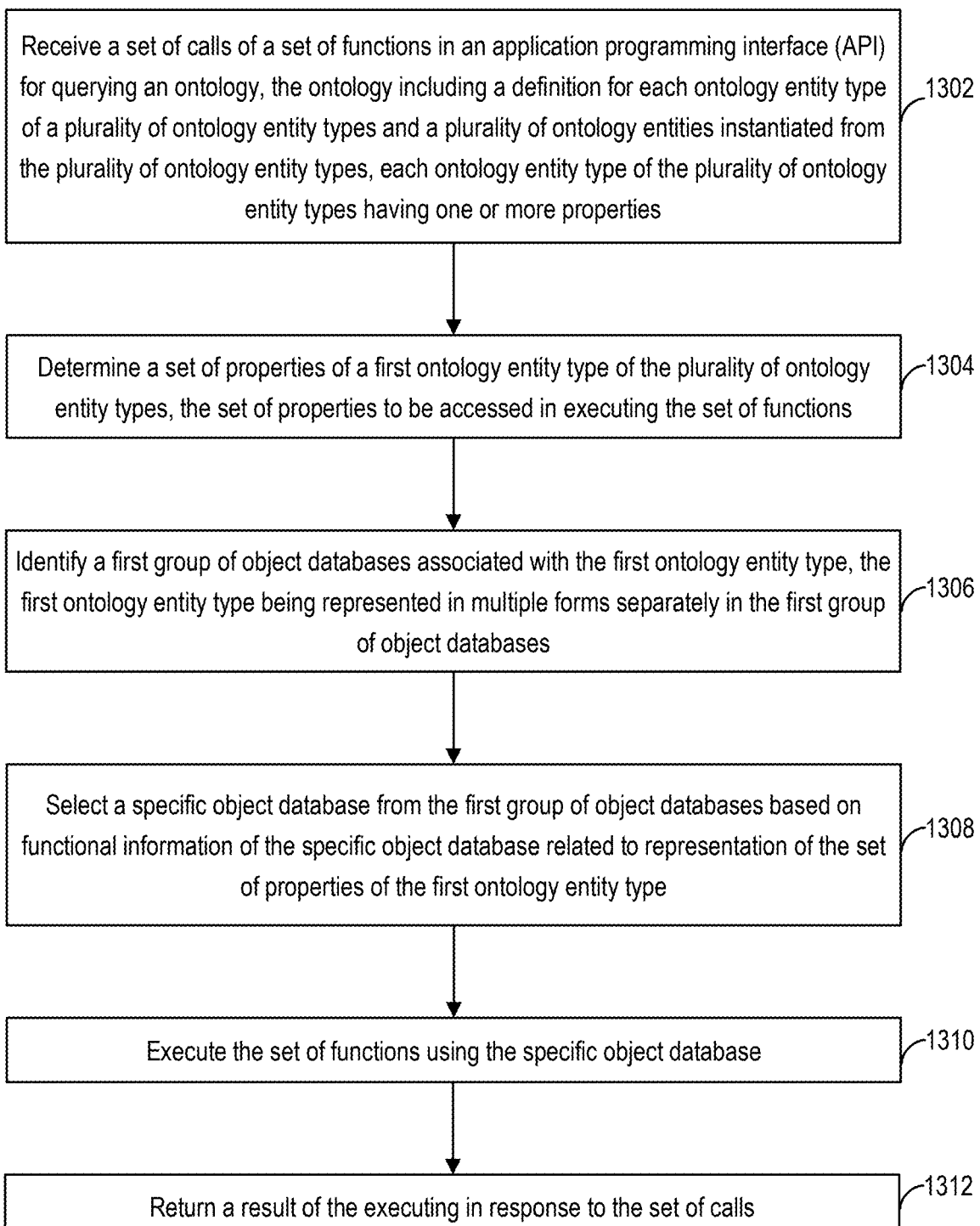

Receive a set of calls of a set of functions in an application programming interface (API) for querying an ontology, the ontology including a definition for each ontology entity type of a plurality of ontology entity types and a plurality of ontology entities instantiated from the plurality of ontology entity types, each ontology entity type of the plurality of ontology entity types having one or more properties  —1302

Determine a set of properties of a first ontology entity type of the plurality of ontology entity types, the set of properties to be accessed in executing the set of functions  —1304

Identify a first group of object databases associated with the first ontology entity type, the first ontology entity type being represented in multiple forms separately in the first group of object databases  —1306

Select a specific object database from the first group of object databases based on functional information of the specific object database related to representation of the set of properties of the first ontology entity type  —1308

Execute the set of functions using the specific object database  —1310

Return a result of the executing in response to the set of calls  —1312

FIG. 13

PROVIDING A UNIFIED QUERY INTERFACE ACROSS MULTIPLE ONTOLOGY-BASED DATABASES

BENEFIT CLAIM

This application claims the benefit under 35 U.S.C. § 119(e) of U.S. Provisional Application No. 63/637,310, titled "PROVIDING A UNIFIED QUERY INTERFACE ACROSS MULTIPLE ONTOLOGY-BASED DATA-BASES" and filed on Apr. 22, 2024, the entire contents of which are hereby incorporated by reference as if fully set forth herein.

TECHNICAL FIELD

The present disclosure relates to ontology-based database operations, and more particularly to database operations related to indexing, conflict resolution, versioning, and access control.

BACKGROUND

Data originating from data sources can be organized and structured according to an ontology, which facilitates understanding of and access to the data. The ontology can be backed by databases where the data is stored. It would be helpful to properly manage the databases while fully supporting operations of the ontology.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 5A illustrates part of an example process of resolving conflicts between data source updates and user edits using the conflict resolution strategy that prioritizes user edits.

FIG. 5B illustrates part of an example process of resolving conflicts between data source updates and user edits using the conflict resolution strategy that prioritizes user edits.

FIG. 5C illustrates part of an example process of resolving conflicts between data source updates and user edits using the conflict resolution strategy that prioritizes user edits.

FIG. 7 illustrates an example process of indexing data changes to ontology-based databases in accordance with disclosed embodiments.

FIG. 9 illustrates a process of managing access control for ontology data in accordance with disclosed embodiments.

FIG. 10 illustrates an example process of handling different access requests across different object databases over a time period using different strategies.

FIG. 11 illustrates a process of managing versioning of ontology data represented in multiple forms respectively in multiple databases in accordance with disclosed embodiments.

FIG. 12 illustrates examples calls to the API for querying an ontology.

FIG. 13 illustrates a process of providing a unified query interface across multiple databases in accordance with disclosed embodiments.

DETAILED DESCRIPTION OF CERTAIN EMBODIMENTS

Figure 1:
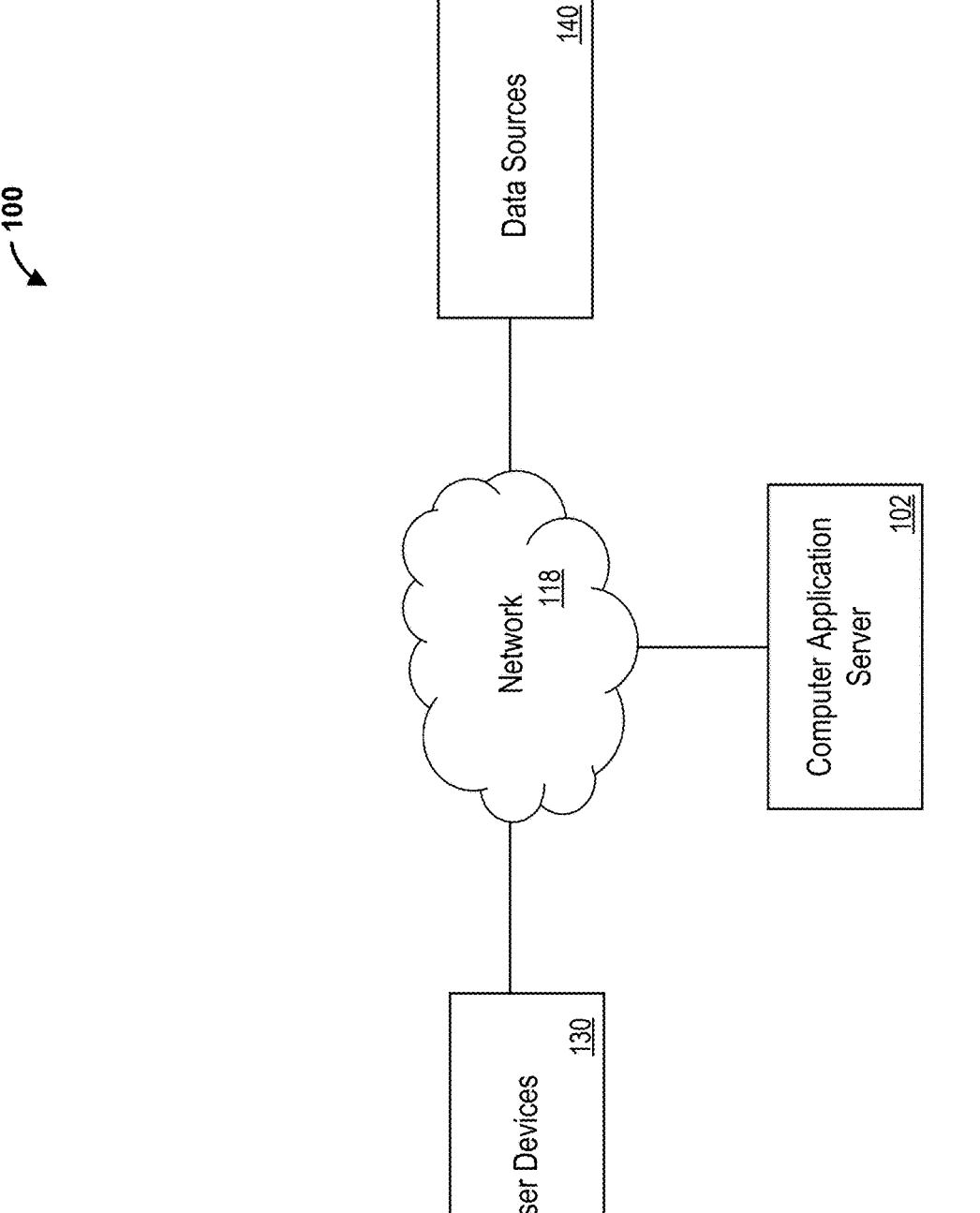
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system for providing a unified query interface across multiple ontology-based databases and related methods are disclosed. The system is programmed to receive calls to an application programming interface (API) for querying an ontology, where ontology data is represented in different databases respectively in different forms. For each function being called, system is programmed to select a database from the different databases based on the function type and each ontology entity type being processed by the function. The system is further programmed to retrieve data from each selected database, merge the retrieval results as appropriate, and transform the final result to ontology data in response to the calls.

In some embodiments, the system is programmed to manage the ontology, which includes definitions of ontology entity types, and ontology entities that are instantiated from the ontology entity types. An ontology entity type is generally an object type or a link type and has one or more properties. For example, an ontology object type can correspond to a person and has properties corresponding to a person's residence and occupation, and an ontology link type can correspond to a relationship between two people.

In some embodiments, the system is programmed to represent each ontology entity type and thus each ontology entity of the ontology entity type in multiple forms respectively in multiple databases having different capabilities. As one example, a first database can be a relational database that is particularly suitable for exploring properties of ontology entities, while a second database can be a graph database that is especially suited for exploring relationships between ontology entities. As another example, a third database can represent certain properties in a compressed or encrypted form that is not suitable for querying, while a fourth database can include an index for a certain combination of properties that facilitate specific access to the combination of properties.

In some embodiments, the system is programmed to receive calls of functions in the API for querying the ontology. For example, the calls can constitute a filter used to identify a set of ontology entities that satisfy certain criteria. Each function typically operates on or takes as an input an ontology entity or specific properties of an ontology entity type. For example, the exactMatch( ) function operates on an ontology entity property and compares that with another ontology entity property or a property value as an input.

In some embodiments, to execute a function, the system is programmed to identify each ontology entity type being processed and determine a group of databases where the ontology entity type is represented. The system is programmed to then select one of the databases that can be used to execute the function efficiently. The selection can be performed based on functional information of each database describing its capabilities, an estimated performance of each database, or a predetermined priority assigned to the database relative to other databases in the group. For example, to execute the exactMatch( ) function that has a specific property as an input, two databases may both have indices for the columns corresponding to the specific property but one of them can be selected from showing a better estimated performance thanks to less network traffic. Upon selecting an object database, the server 102 is programmed to retrieve appropriate data from the object database in executing the function. The server 102 can be further programmed to combine all data retrieved from the object databases in executing the calls and transform the result into ontology data as a response to the calls.

The system disclosed herein has several technical benefits. An ontology provides a structure to any large volume of data, which facilitates user interaction with the data. By automatically selecting appropriate object databases for executing function calls into the API, the system optimizes performance by utilizing the most appropriate capabilities to serve a query. By providing a unified interface for querying the ontology, the system allows a consistent focus on the ontology without requiring knowledge of how ontology data is represented or where the ontology is stored.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer server ("server") 102, one or more user devices 130, and one or more data sources 140, which are communicatively coupled through direct physical connections or via a network 118.

In some embodiments, the server 102 is programmed or configured to manage datasets representing data sources, which are transformed to ontology data, and databases representing the ontology data in multiple forms. The management comprises integrating multiple sources of change to the ontology data, representing changes to the ontology data in different forms, and allow access to the ontology data in various granularities. The server 102 can comprise any centralized or distributed computing facility with sufficient computing power in data processing, data storage, and network communication for performing the above-mentioned functions.

In some embodiments, each user device of the one or more user devices 130 is programmed to submit access requests to the server 102 to access the ontology and receive replies to the access requests from the server 102. The access requests can include reading, writing, adding, or deleting ontology data. Each user device can comprise a personal computing device, such as s desktop computer, laptop computer, tablet computer, smartphone, or wearable device.

In some embodiments, each data source of the one or more data sources 140 is programmed to provide original data to the server 102, which represents the original data as datasets, or accept changes to the original data based on updates to the datasets from the server 102. Each data source can generally be similar to the server 102 and comprise any computing facility with sufficient computing power in data processing, data storage, and network communication for performing the above-mentioned functions.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed or configured to receive original data from the one or more data sources 140. The server 102 is programmed to set up datasets representing the one or more data sources 140 and transforming data in the datasets to ontology data. The server 102 is programmed to further represent the ontology data in multiple databases. On the other hand, the server 102 is programmed to receive access requests from the one or more user devices 130, including user edits to the ontology data. The server 102 is programmed to also integrate these user edits into the multiple databases. The server 102 can also be programmed to materialize these user edits into datasets and transform data in these datasets for integrating into the datasets representing the one or more data sources 140 and ultimately updating the one or more data sources 140.

3. Functional Descriptions

Figure 2:
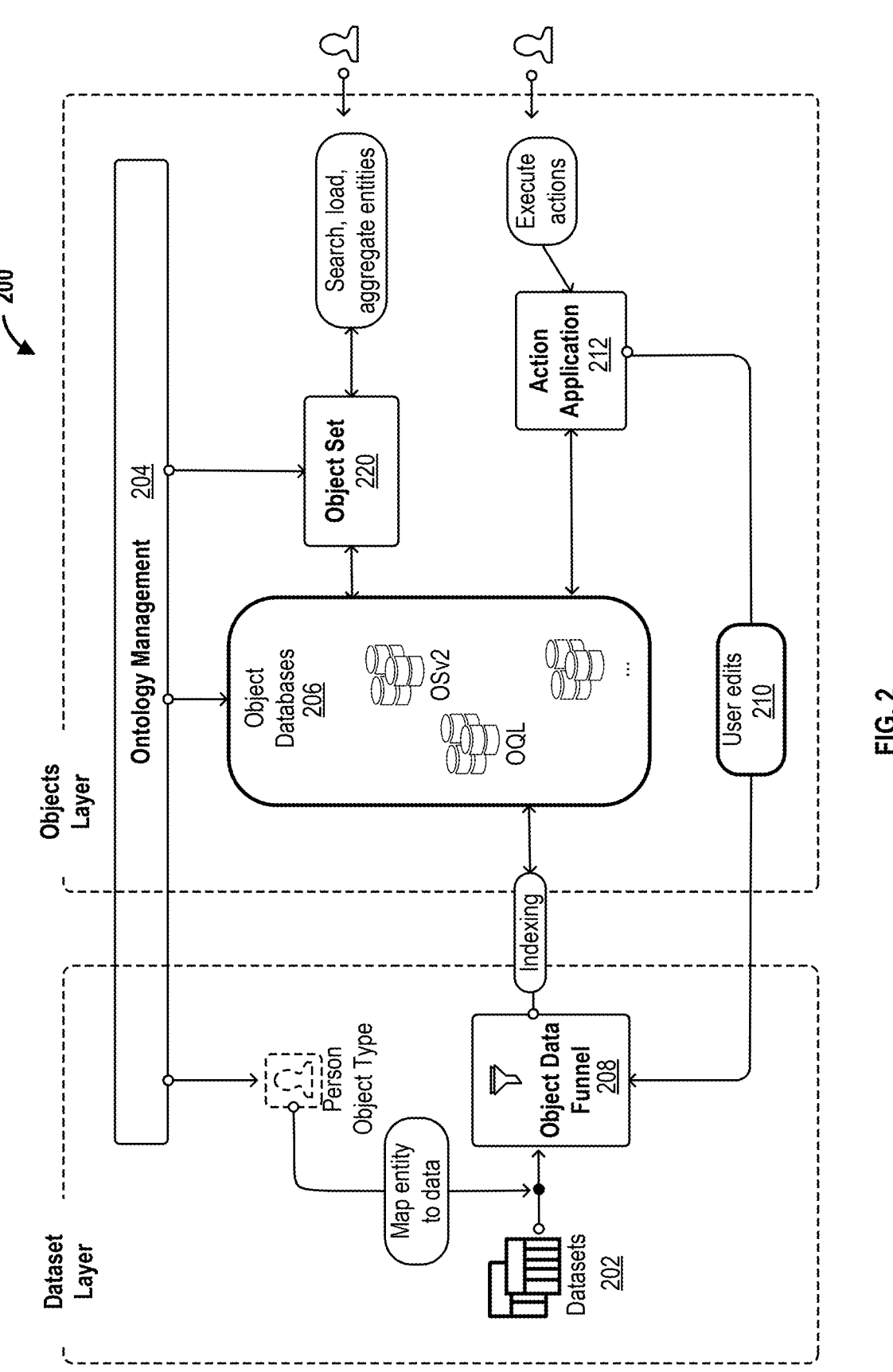
FIG. 2 illustrates an example set of components of and workflows managed by a computer application server ("server").

FIG. 2 illustrates an example set of components of and workflows managed by the server 102. In some embodiments, the server 102 is programmed to receive original data from various data sources and maintain them as datasets 202. The data sources can include file systems, database management systems, streaming sources, or blob stores, for example. A dataset is a wrapper around a collection of files which are stored in a specific file system. The datasets 202 can contain mainly structured and semi-structured data, from which one or more schemas can be inferred. Each schema specifies how a file is to be parsed into a specific format, such as a tabular format having rows and columns.

In some embodiments, the server 102 is programed to establish a mapping between the group of datasets and an ontology via the ontology management 204 as a service. The ontology includes definitions for all relevant object types, such as people, computers, networks, documents, or events, with objects being instantiated from the object types. The ontology can also separately include definitions for all relevant link types, such as similarities or dependencies, with links being instantiated from the link types. Specific structures, such as properties or versions, and specific operations, such as revision, access control, or provenance tracking at the object, link, or property level (or corresponding row or column level) apply to all object types and all link types. The object types and link types are considered as "ontology entity types". The objects and the links are considered as "ontology entities", which encompass the properties. The ontology and relevant metadata are considered as "ontology data". The ontology management 204 can manage definitions for an API that allows access to the ontology entities and the structures. The mapping between the group of datasets and the ontology would associate, for each dataset, one or more ontology entity types to which the dataset can be transformed. The server 102 can be further programmed to establish, for each dataset, a transformation between a schema for the dataset and definitions for the one or more ontology entity types to which the dataset is associated. For example, a column in the schema can be transformed to a property of an object type and vice versa. When more original data is received from the various data sources and maintained as updated datasets, any updates in the updated datasets can be readily converted to ontology data according to the transformation.

In some embodiments, the server 102 is programmed to store representations of ontology entity types and thus ontology entities in one or more ontology databases 206 (also called "object databases") via an ontology data funnel 208 (also called "object data funnel") as a service. The object data funnel 208 implements an indexing process of making the datasets as transformed to corresponding ontology data available in the object databases 206 for fast retrieval in response to user queries. The fast retrieval is achieved by the organization of the ontology, the representation of the ontology data in multiple object databases having different capabilities, and the availability of indices of ontology data and a mapping between the ontology and the object databases 206.

As links connect objects, link information could be considered as part of an object and vice versa. Therefore, representation of link types and that of object types can affect each other. In some embodiments, the server 102 is programmed to represent an object type or link type in different ways in different object databases in accordance with the different capabilities of the different object databases. As one example, in a relational object database, an object may be represented as a row while a property of an object may be represented as a column, which enables fast identification of objects that have certain property values. As another example, in a graph object database, an object may be represented as a node and a link between two objects may be represented as an edge, which enables fast exploration of relationships or links among objects. In other examples, the object databases can specialize in representing a property in a compressed form or an encrypted form, or representing properties in a specific order to form an index.

In some embodiments, the server 102 can be programed to establish the mapping between the object databases and the ontology also via the ontology management 204. This mapping would associate, for each ontology entity type, one or more object databases to which the ontology entity type can be transformed. The server 102 can be further programmed to establish, for each ontology entity type, a transformation between a definition for the ontology entity type and one or more schemas for the one or more object databases to which the ontology entity type is associated.

For example, a property of an object type can be transformed to a column in a schema and vice versa. Subsequently, any changes to the ontology can be readily converted to changes in the object databases 206 according to this transformation.

In some embodiments, the server 102 is programmed to represent each ontology entity type in at least one of the object databases 206, with the one being considered as the canonical object database for the ontology entity type. The server 102 can be programmed to also represent the ontology entity type in one or more secondary object databases. As changes are made to the ontology data, the indices could be updated as part of the indexing process implemented by the object data funnel 208. In addition, the server 102 can be programmed to represent each ontology entity in different versions in the object databases 206 and preserve versioning consistency across the object databases 206. The availability of a particular version in the canonical object database can be used to determine whether a particular version of an ontology entity is to be served in response to user queries.

In some embodiments, the server 102 is programmed to manage not only objects or links including components originating from only one data source but also objects including components originating from multiple data sources. Each ontology entity that originates from multiple data sources is referred to as a multi-data source ontology entity ("MDO"). An MDO typically has these components that correspond to respective data sources and are separately represented in the object databases 206. For example, separate components could be stored as separate columns in an object database. The server 102 can be further programmed to control access to the ontology data, from the ontology level down to the component level. Such access control can be extended to the object databases 206 where the ontology data are represented.

In some embodiments, the server 102 is programmed to receive queries from a user device associated with a user account and execute the query via the ontology set 220 (also called "object set") as a service. The object set 220 can support the API for querying the ontology noted above. The API would include a set of functions that operate on ontology entity types or ontology properties, such as filters or aggregators. These functions generally correspond to read requests to view ontology data, which require read access to the object databases 206. These functions can also be called to process ontology data before actions are applied, as discussed below. The actions correspond to write requests to modify ontology data, which require write access to the object databases 206.

In some embodiments, the server 102 is programmed to receive an action comprising user edits 210 to ontology data from a user device, and apply the action via the action application 212 as a service. In this ontology context, an action specifies user logic to change data related to one or more ontology entities and is to be performed as a single transaction. In other embodiments, the server 102 is programmed to receive updates to the datasets 202 from the data sources. As noted above, when such updates are received, they can be readily converted to corresponding changes to the ontology data according to the transformation.

In some embodiments, the server 102 is programmed to store representations of ontology data in the object databases 206 via the object data funnel 208, as discussed above. The object data funnel 208 can implement the indexing process by indexing only changes and sending the indexed changes to the object databases 206. As the changes can originate from the user edits 210 or data source updates (that turn into dataset updates), the server 102 can be programmed to resolve any conflicts in the received changes before indexing the changes and sending the indexed changes via the object data funnel 208 to the object databases 206.

3.1. Processing User Edits to Ontology Data

In some embodiments, the server 102 is programmed to allow users to make changes to ontology data as user edits by creating actions, as discussed above. An action specifies user logic to make these changes and is to be performed as a single transaction. For example, an action type that defines an Assign Employee action can specify changing the Role property value for a given Employee object based on user input and creating a link between the Employee object and a new Manager object based on specific rules. As illustrated in this example, an action can include a series of user edits, with each corresponding to one change, such as updating the value of one property or deleting an object. Each user edit can be represented as a record that indicates a primary key identifying an object or a link in the ontology, an order, change information describing what is being changed, or other relevant data.

In some embodiments, the server 102 is programmed to receive a request to apply an action to change ontology data from a user device. The server 102 can be programmed to store the request in an action queue together with a request timestamp, such as coordinated universal time (UTC) offset, to support user edits included in multiple actions to be applied. The request timestamp is associated with all the user edits included in the action. The server 102 can also be programmed to receive requests to read or view ontology data and store these requests together with request time-stamps. All requests are processed based on the corresponding request timestamps. This ensures that, for example, when an object read occurring as part of an ontology query is requested after an object modification is made, the result of the object read is guaranteed to reflect the user edits in the user modification. The server 102 is further programmed to dequeue the requests at least from the action queue continuously or based on a predetermined schedule or triggers.

3.2. Indexing Data Changes to Object Databases

Figure 3:
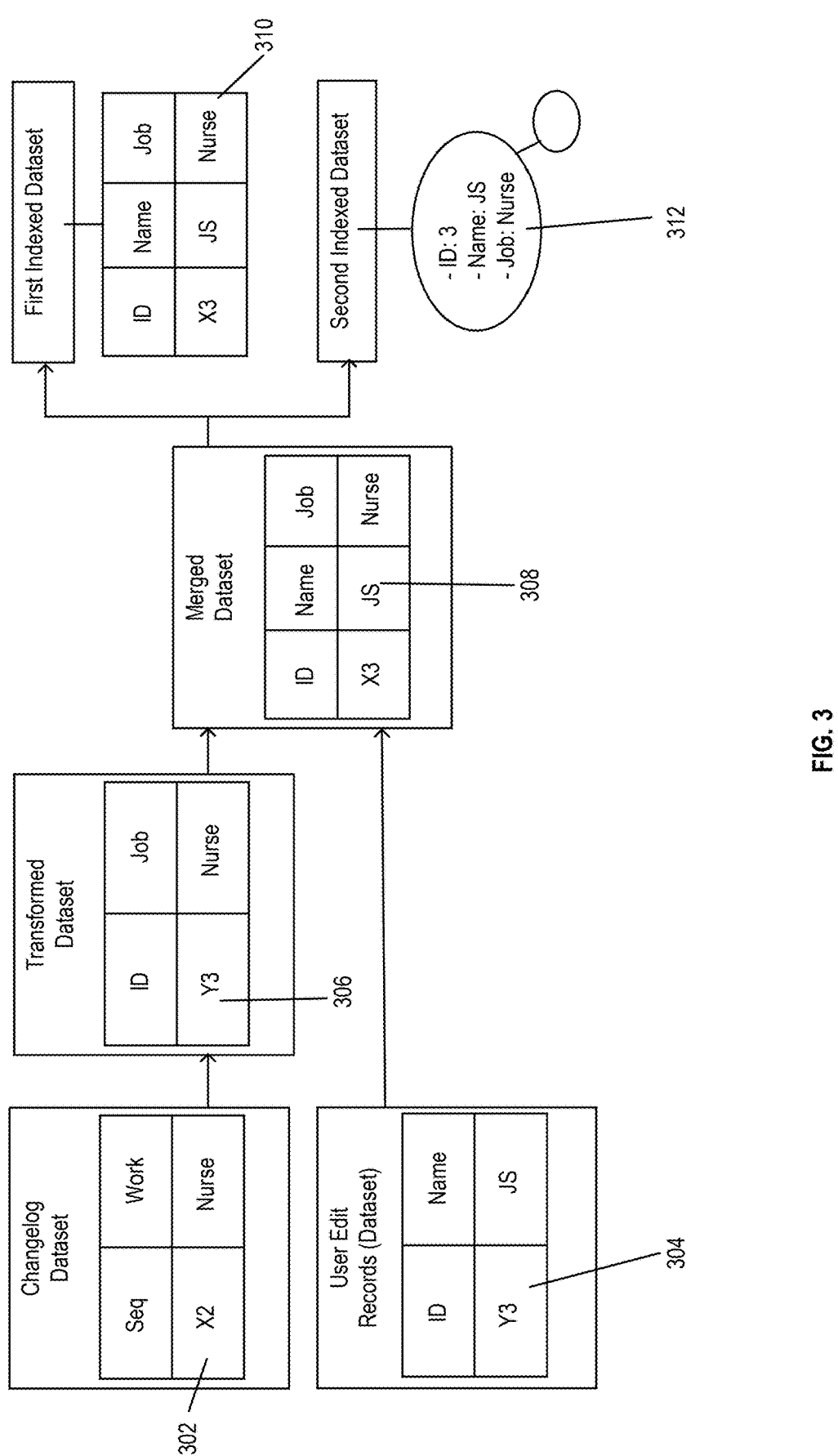
FIG. 3 illustrates an example view of an indexing pipeline implemented by the server via the object data funnel.

FIG. 3 illustrates an example view of an indexing pipeline implemented by the server 102 via the object data funnel 208. FIG. 3 is shown in simplified, schematic format for purposes of illustrating a clear example and other embodiments may include more, fewer, or different elements connected in various manners, or different values within different elements.

3.2.1. Creating Changelog Datasets for Data Source Updates

In some embodiments, the server 102 is programmed to receive new original data from a data source and compute the difference or change from what is already in the data source via the corresponding dataset. For example, when the dataset contains rows and columns, the difference could be an addition, removal, or update of a row (with a new value for a column). The server 102 is programmed to then create a changelog dataset. The changelog dataset can indicate, for each difference, a primary key of the affected row, an order (e.g., a change timestamp), change information describing what is being changed, or other relevant data. For example, in FIG. 3, a changelog dataset contains a row 302 having "X2" as the value for the Seq column, and "Nurse" as the updated value for the Work column. The server 102 can be programmed to maintain a single changelog dataset at a time or one changelog dataset for each data source. Each changelog dataset can be developed through append transactions that add new files indicating the computed differences.

3.2.2. Merging Data Source Updates and User Edits

In some embodiments, the server 102 is programmed to combine data source updates and user edits, which constitute two sources of change to the object databases 206. The data source updates can come from a changelog dataset, and the user edits can come from an action queue. For example, in FIG. 3, a set of user edit records in the action queue contains a record 304 having "Y3" as the value for the ID field and "JS" as the updated value for the Name field. This record corresponds to a request to update the value of the Name property of a Person object with a primary key of "Y3" for the ID property in the ontology. The user edit records can also be stored into a user edit dataset for downstream processing. The server 102 can be configured to perform this combination or merge of data source updates and user edits based on a predetermined schedule or triggers. Example triggers include when a certain amount of data in either source of change has been received or detected or when a certain period of time has passed. It is possible that when a trigger runs, only one of the sources of change is available for the merge.

In some embodiments, the server 102 is programmed to merge the data source updates and the user edits into a merged dataset that enables efficient indexing into the object databases 206. While the user edits would generally refer to ontology data, such as an object ID, the data source updates involve original data in the data sources. The server 102 thus can be programmed to convert the changelog dataset into a transformed dataset that refers to the ontology data using the transformation discussed above. For example, in FIG. 3, the transformed dataset corresponding to the changelog dataset contains a row 306 having "Y3" as the value for the ID column and "Nurse" as the updated value for the Job column, which respectively correspond to the ID property and the Job property of a Person object.

In some embodiments, the server 102 is programmed to join the transformed dataset and the set of user edit records (or the user edit dataset) into a merged dataset based on primary keys each identifying an object or a link in the ontology. For example, in FIG. 3, after the transformation, since the row 306 and the record 304 have a common value for the primary key, they can be joined together to create the merged dataset that has a row 308 having "Y3" as the value for the ID column, "JS" as the updated value for the Name column, and "Nurse" as the updated value for the Job column. The merged dataset can be incorporated back into the data sources. The merged dataset can contain one row for each ontology entity that includes all the compatible changes being made to the ontology entity. When certain changes respectively from the two sources of change are conflicting and thus incompatible, the server 102 is configured to resolve the conflict, as further discussed in Section 3.3.

3.2.3. Creating Index Data

In some embodiments, the server 102 is programmed to create an index dataset from the merged dataset for at least one of the object databases 206. These index datasets enable fast retrieval of representations of ontology data in the object databases 206. As discussed above, each ontology entity type can be represented in multiple object databases. The server 102 can be configured to first consult the mapping that indicate how each ontology entity type covered in the merged dataset is represented in multiple object databases. The server 102 can be further programmed to determine for which object databases the index datasets need to be generated from the merged dataset. As each object database has its set of capabilities and its approach of organizing data, the index datasets for different object databases can look different. For each object database, the server 102 can be configured to then consult the database schema and then create a corresponding index dataset in the format required by the object database.

In some embodiments, an index dataset comprises indices of the changes captured in the merged dataset to ontology entities that are represented in the corresponding object database. Each index can include a list of identifiers of the objects or links undergoing changes and the corresponding changes. The index dataset can additionally include a pointer to a specific location in the appropriate dataset for each of the affected object or link. For example, an index in an indexed dataset can indicate that for the Job property, a first object that has an updated value of "Nurse" has "Y3" as the value for the ID property and a second object that has the same updated value has "W9" as the value for the ID property. This index thus communicates the changes and also enables an efficient search of the ontology based on the Job property of the person object type. The index could also point to the dataset that gives rise to the object, which would contain the entire row corresponding to the object. In FIG. 3, the merged dataset leads to the first indexed dataset that facilitates finding an object that is represented as a row 310 having "JS" as the value for the Name column and "Nurse" as the value for the Job column in a first object database that is a relational database, and a second index dataset that facilitates finding t-the same object that is represented as a node 312 with having "JS" as the value for the Name attribute and "Nurse" as the value for the Job attribute in a second object database that is a graph database.

In some embodiments, the server 102 is programmed to apply an action immediately by dequeuing the request to apply, creating corresponding index data directly from the user edits in the action, and transmitting the index data to one or more object databases in real time. This process bypasses the persistence of the user edits via the user edit dataset or the merged dataset via the object data funnel 208. However, user edits are also persisted periodically, as discussed above. Therefore, index data can be created directly from the user edit records or from intermediary index datasets or other temporary files, based on the database schema for each object database. As actions are applied immediately and indexed into the object databases continuously, the user edits to be persisted into a merged dataset can generally already be indexed into the object databases. The merged dataset and a corresponding index dataset generally would not conflict with the index data or representation of the ontology data in the object database as long as the data source updates do not take precedence over the user edits but are merely verified against the user edits.

3.2.4. Preparing Changed Ontology Data for Querying

In some embodiments, the server 102 is programmed to transmit data from the index datasets to the appropriate object databases that can be queried. This approach can be analogized to the approach discussed in U.S. Pat. No. 11,169,507, where the updates from the data sources and the user edits can correspond to the log stream, the merged datasets can correspond to the hot storage associated with the indexers or the data stored in that hot storage, the index datasets can correspond to the indexed portions, and the object databases can correspond to the hot storage associated with the search nodes or the data stored in that hot storage. According to the approach discussed in the patent, some indexed portions can be stored in cold storage associated with the indexers, and a catalog can include only metadata or pointers to locations of the indexed portions in the cold storage instead of the actual indexed portions. The catalog is then consulted in response to a search request, and an appropriated indexed portion is then retrieved from the cold storage based on the consultation and transmitted to the hot storage associated with the search nodes. Therefore, while in some embodiments, the indexed datasets include the indexed portions as indices and are transmitted to the object databases according to a predetermined schedule or specific triggers, in other embodiments, some of the indices can be pushed to certain cold storage and transmitted to the object databases according to a similar catalog only in response to search requests. Example triggers for transmitting the index datasets include when a certain amount of data in one or more index datasets has become available or when a certain period of time has passed.

3.3. Resolving Conflicts Between User Edits and Data Source Updates

As discussed above, data source updates and user edits constitute two sources of change to the object databases. When certain changes are conflicting and thus incompatible, the server 102 is configured to resolve the conflict. In some embodiments, when a specific object or link with a primary key value is subject to conflicting changes from the data sources and user edits in a merged dataset, the server 102 is programmed to resolve the conflicts with a conflict resolution strategy. The merged dataset can include multiple changes associated with the primary key and different time-stamps. The server 102 can be programmed to go through these changes in a chronological order in applying the conflict resolution strategy. The merged dataset can thus include one row for each ontology entity with all the changes to be made.

In some embodiments, the server 102 is programmed to adopt a conflict resolution strategy that prioritizes user edits. The strategy can enforce the following resolution rules. (1) Once an ontology entity is modified based on a user edit, the user edit remains effective until overridden by another user edit when the ontology entity is not being deleted. (2) Rule (1) holds except that a data source update to delete a corresponding row will be effective when the corresponding ontology entity was not created based on a user edit. (3) Rule (1) holds despite the ontology entity being possibly deleted and recreated again based on data source updates. (4) Once an ontology entity is created or deleted based on a user edit, all future data source updates to the ontology entity are ignored. Pursuant to these rules, the server 102 is programmed to consider data source updates to an ontology entity originally created based on a data source update until the object is deleted based on a user edit. Once a user edit is applied to a property of an ontology entity, the server 102 is programmed to receive further changes to the property only based on user edits.

Figure 4:
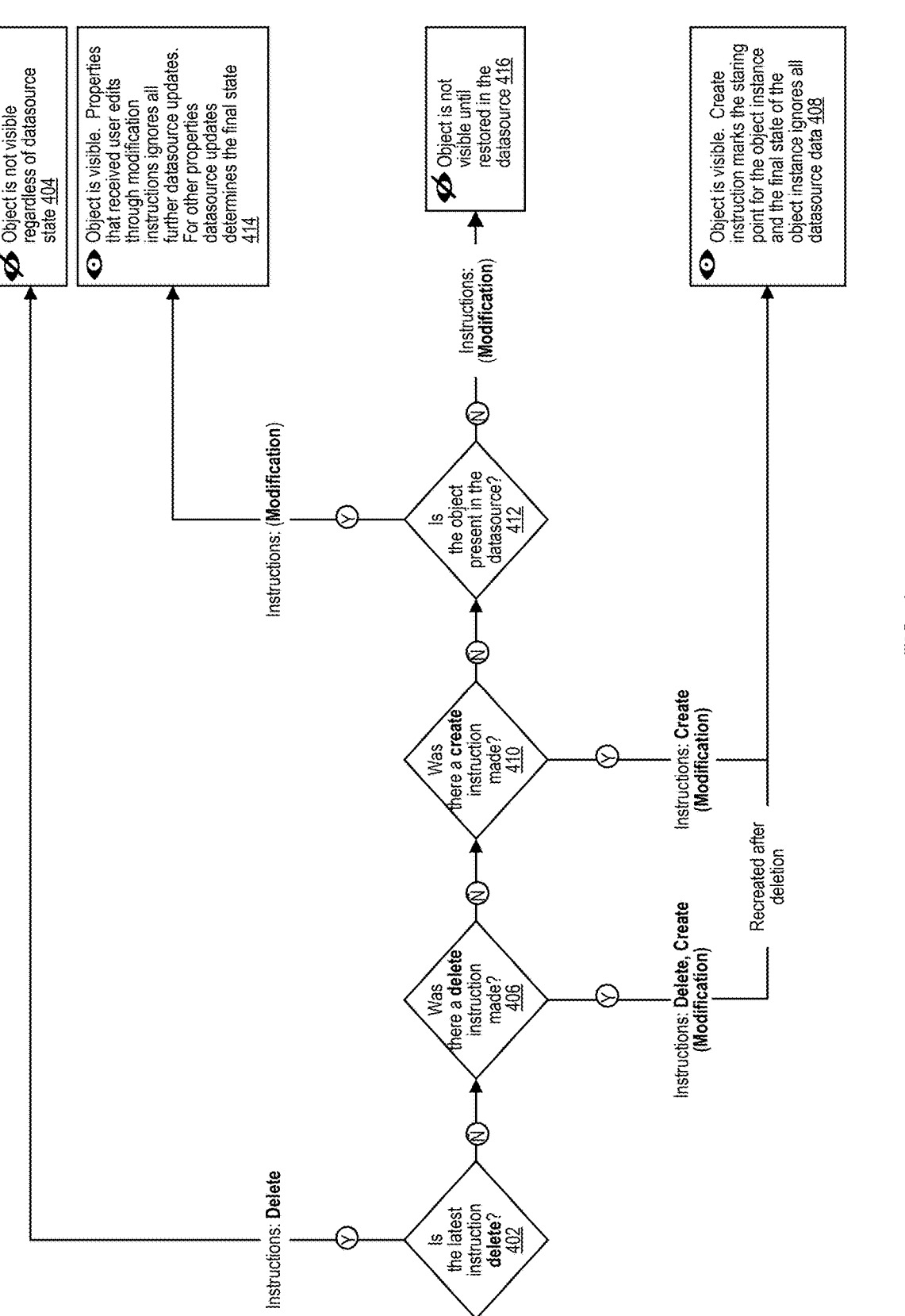
FIG. 4 illustrates an example framework for resolving conflicts between data source updates and user edits using the conflict resolution strategy that prioritizes user edits.

FIG. 4 illustrates an example framework for resolving conflicts between data source updates and user edits using the conflict resolution strategy that prioritizes user edits. In some embodiments, for each latest user edit, at step 402, the server 102 is programmed to determine whether this latest user edit is to delete an object from the ontology. In response to a positive determination, at step 404 the server 102 is programmed to conclude that the object is not visible in the ontology, regardless of whether any corresponding row is in one of the data sources. In response to a negative determination, which means that the latest user edit is to create or modify an object in the ontology, at step 406, the server 102 is programmed to determine whether there was a user edit to delete the object. In response to a positive determination, which means that the user edit is to recreate the, at step 408, the server 102 is programmed to conclude that the object is visible in the ontology, and ignore future data source updates to the object. In response to a negative determination, at step 410, the server 102 is programmed to determine whether there has been a user edit to create the object. In response to a positive determination, which means that the user edit is to initially create the object (after a data source update to delete the object), the server 102 similarly reaches step 408. In response to a negative determination, which means that the latest user edit is to modify an object that was not last created based on a user edit, at step 412, the server 102 is programmed to determine whether the object is present in the database. In response to a positive determination, which means that the object was created based on a data source update, at step 414, the server 102 is programmed to conclude that the object is visible in the ontology, and ignore future data source updates to properties that are being modified in the latest user edit. In response to a negative determination, which means that a modification is being attempted in the latest user edit to an object that has not been created or recreated in the ontology, at step 416, the server is programmed to conclude that the object does not exist and thus is not visible in the ontology.

FIGS. 5A, 5B, and 5C illustrate an example process of resolving conflicts between data source updates and user edits using the conflict resolution strategy that prioritizes user edits. In FIG. 5A, at time T0, there is a data source update to set a row with values for the col1 and col2 columns. Therefore, an object identified by the primary key of "pk1" is created in the ontology with values for the col1 and col2 properties. At time T1, there is a data source update to remove all columns. Therefore, the object is deleted from the ontology. At time T2, there is a data source update to set a row with values for the col1 and col2 columns. Therefore, the object is recreated in the ontology. At time T3, there is a user edit to modify the value of the col2 property. Therefore, the value of the col2 property of the object is changed in the ontology. At T4, there is a data source update to remove all columns. Therefore, the object is deleted from the ontology pursuant to Rule (2) noted above. At T5, there is a data source update to set a row with values for the col1 and col2 columns as well as the user edit made at T3 pursuant to Rules (1) and (3) noted above. Therefore, the conflict involving the property col2 is to be resolved by prioritizing user edits. The object is then recreated in the ontology with values for the col1 and col2 columns, where the value comes from the user edit. At time T6, there is a data source update to modify the value of the column col1 of the row. Therefore, the value of the col1 property of the object is changed.

In FIG. 5B, at time T7, there is a user edit to delete the object, and the user edit made at time T3 is no longer effective pursuant to Rule (1) noted above. Therefore, the object is deleted from the ontology. At time T8, there is a data source update to modify the value of the col3 column of the row against the user edit made at T7. Therefore, the conflict involving all the properties is to be resolved by prioritizing user edits. The object then remains deleted from the ontology pursuant to Rule (4) noted above. At time T9, there is a user edit to create the object with a value for the col3 property. Therefore, the object is recreated with a value for the property col3. At time T10, there is a data source change to modify the value of the col2 column of the row against the user edit made at time T9. Therefore, the conflict involving the col3 property is to be resolved by prioritizing user edits. The object then remains unchanged in the ontology pursuant to Rule (4). At time T11, there is a user edit to modify the value of the col2 property of the object. Therefore, the value of the col2 property is changed in the ontology. At time T12, there is a data source update to delete all the columns against the user edit made at T11. Therefore, the conflict involving all the properties is to be resolved by prioritizing user edits. The object then remains unchanged in the ontology pursuant to Rule (4).

In FIG. 5C, at time T13, there is a data source update to create the row with values for the columns col1, col2, and col3 as well as a user edit to delete the object from the ontology. Therefore, the conflict involving all the properties is to be resolved by prioritizing user edits. Then object then is deleted from the ontology pursuant to Rule (4). At time T14, there is a user edit to modify the object without creating the object, which would fail. Therefore, the object remains deleted from the ontology.

In some embodiments, the conflict resolution strategy is to prioritize data source updates, prioritize the more recent changes, or follow other predetermined logic. The server 102 can be programmed to adopt the same conflict resolution strategy across all object types. Alternatively, the server 102 can be programmed to adopt different conflict resolution strategies for different portions of the ontology, such as a specific conflict resolution strategy for a specific object type, a specific object type and all the sub-object types, or a specific object type and all the linked object types.

3.4. Controlling Ontology Data Permissions

As discussed above, an ontology has objects and links, and each object or link has properties. In addition, each MDO has multiple components corresponding to multiple data sources, where each component includes properties that come from a single one of the multiple data sources. In certain embodiments, different components of an MDO include different properties, thus allowing no duplicity within the object.

In some embodiments, the server 102 is programmed to control access to the ontology at different levels, such as the ontology level, link type level, link level, object type level, object level, component level, or property level. The access control can be defined with respect to a hierarchy of user roles and a set of permissions or access levels.

In some embodiments, the server 102 is programmed to associate each data source with a set of user roles for users or user accounts and corresponding permissions. For example, an ontology owner role has full access including being able to manage permissions, an ontology editor role is less than the owner role by not being able to manage permissions, an ontology viewer role is less than the editor role by not having editing permissions, and an ontology discoverer role is less than the viewer role by only being to see select metadata. In general, each data source leads to a distinct set of object types and link types, and the access control of the data source can determine the access control of the distinct set of object types and link types. In the case of MDOs, multiple data sources lead to an ontology entity type, and the access controls of the data sources can determine the access controls of the multiple components of the ontology entity type. When MDOs are represented in the object databases, such as one with rows and columns, the access controls of the multiple components of each ontology entity type would correspond to column-level access controls.

In some embodiments, the server 102 is programmed to require having permissions to view an entire ontology entity to be able to modify the ontology entity. Therefore, when a user account is granted access by a first data source but not a second data source, the user account would not have access to modify an MDO that originates from both the first data source and the second data source.

In some embodiments, the server 102 is programmed to require permissions as follows for accessing objects of an object type, all properties of which originate from two data sources of D1 and D2. Creating an object of the object type by setting values for the properties that originate from D1 requires only permissions for viewing D1. The values for the properties that originate from D2 could be set to null. Similarly, modifying an object of the object type by setting values for the properties that originate from D1 requires only permissions for viewing D1. Deleting an object of the object type, however, requires permissions for viewing both D1 and D2.

In some embodiments, the server is programmed to require permissions as follows for accessing links of a link type that connects two object types. The first object type has all properties originating from D1, and the second object type has all properties originating from D2. Creating or deleting a link of the link type between a first object of the first object type and a second object of the second object type requires only permissions for viewing the first object and the second object.

In some embodiments, the server 102 is programmed to manage granular policies. With each data source leads to a distinct set of object types and link types, the access control of the data source can apply at not only these levels but also the object level, link level, object property level, or link property level with granular policies. A certain granular policy can restrict access to certain ontology entities to certain user accounts based on certain attribute values of the certain user accounts or certain properties of the certain ontology entities. As a result, only those user accounts having the certain attribute values and those ontology entities having the certain property values would meet the requirements of the certain granular policy, and only the certain user accounts would have access to the certain ontology entities or the certain properties of the certain ontology entities. For example, the certain granular policy can allow user accounts from Europe to see and edit European objects. When ontology entities are represented in the object databases, such as one with rows and columns, the access controls that apply at the ontology entity level would correspond to row-level access controls, and those that apply at the property level would correspond to column-level access controls.

Figure 6:
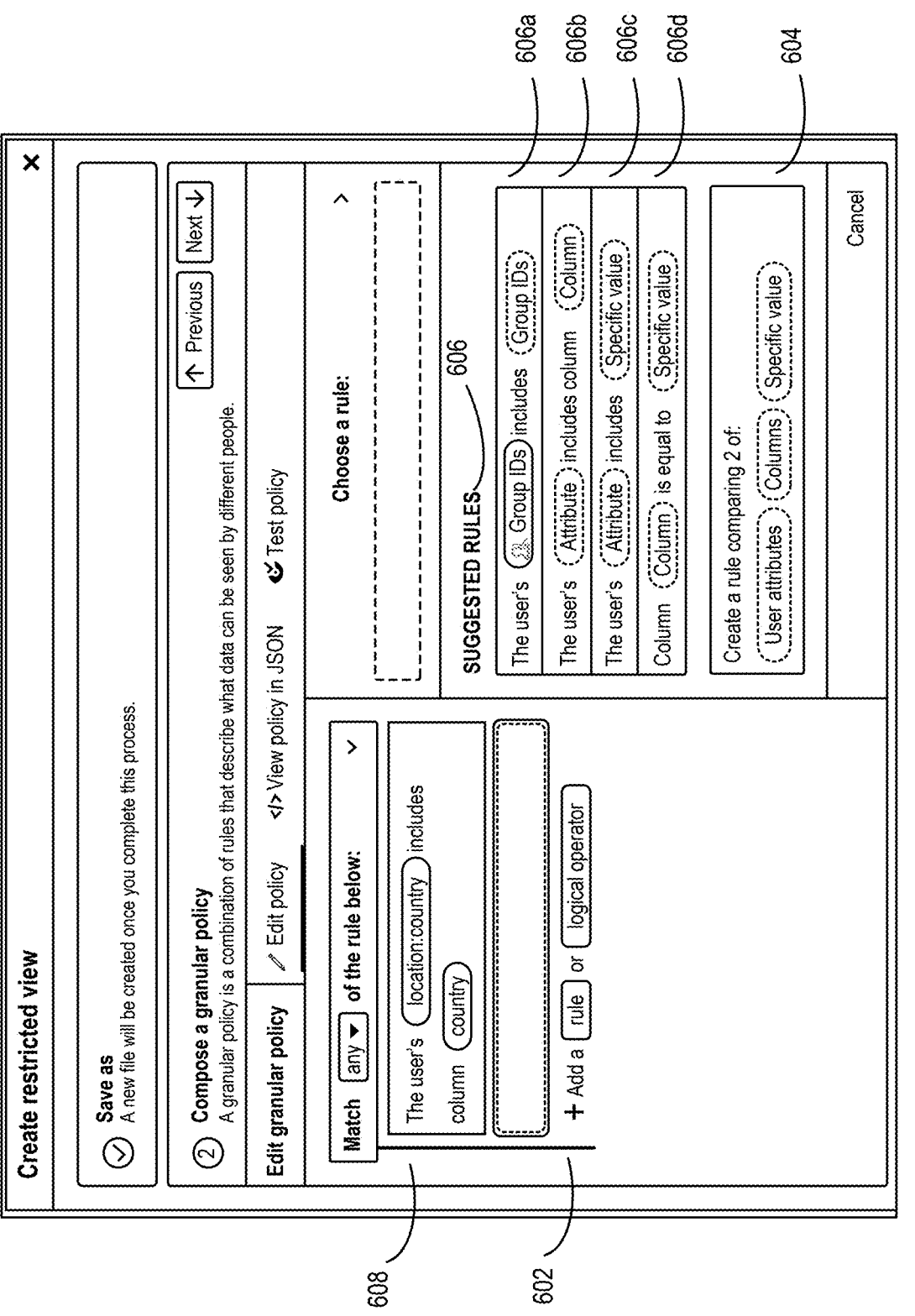
FIG. 6 illustrates an example graphical user interface for creating a granular policy.

FIG. 6 illustrates an example graphical user interface for creating a granular policy. In some embodiments, a granular policy can comprise one or more rules combined by logical operators. An administrator, such as a user in the ontology owner role, can add a rule or logical operator using the buttons in the area 602. For adding a rule, an initial mechanism of choosing two of three items for comparison can be employed in the area 604, and some sample comparisons are listed in the area 606. The initial mechanism allows three types of comparisons. The first type of comparison compares an attribute of a user account ("user attribute") with a specific value, and the rule 606*c* is an example. The second type of comparison compares a property of an ontology entity ("ontology entity property" corresponding to a column) with a specific value, and the rule 606*d* is an example. The third type of comparison compares a user attribute with an ontology entity property, and the rule 606*a* and the rule 606*b* are examples. The administrator can choose two of the three items in the area 604, specify a relational operator, such as "includes" or "is equal to", and obtain an initial rule, such as the rule 606*b*. The user can then instantiate each of the items, such as assigning "Group IDs" to the attribute item and "Group IDs" to the column item of the rule 606*b*, to get the final rule, such as the rule 606*a*, which indicates that the Group IDs user attribute includes a value that is not manually specified but comes from the "Group IDs ontology entity property.

In some embodiments, a final rule can then be displayed in the area 608, and it can be combined with existing rules using one or more logical operators, such as "any". The default access scope for a specific user in an appropriate user role when a rule is satisfied can be the objects that are compared in the rule or all objects otherwise. For example, the default access scope for the specific user from satisfying the rule 606*a* can be all objects where the Group IDs property match the Group IDs attribute of the specific user. The default access scope for the specific user from satisfying the rule 606*c* can be all objects. The default access scope for the specific user from satisfying the rule 606*d* can be all objects where the specified ontology entity property is equal to the specified value. The default access scope for satisfying a combination of rules can be the intersection of the access scopes of the matched rules. Additional elements can be included in the area 602, the area 604, or another area in the graphical user interface for specifying the access scope when each rule or the combination of rules is satisfied, which can be limited to specific properties of the objects. For example, a certain access scope can be defined to exclude from access those object properties that are being compared in the rules and the values thereof for users in roles that have editing permissions, to reduce disruptions to the application of the rules.

As discussed above, in some embodiments, the granular polices are applied on a per data source basis. The access controls associated with data sources can take precedence over those based on granular policies. For example, an object type might have two properties A and B that come from different data sources. For a specific user, the access controls associated with the data sources can determine that the ontology entity property B is inaccessible. When relevant granular policies are applied, only the ontology entity property A is then available for comparison, and the application result can be that only the ontology entity property A of certain objects are accessible. The presentation of the application result can depend on the exact user roles and permissions. When an ontology entity property is accessible, it can mean that only the metadata of the ontology entity property (e.g., identifier) is accessible, or both the metadata and actual value are accessible. Therefore, in the example, the metadata of the ontology entity property A would be shown and the value of this ontology entity property would be shown for the certain objects to the specific user. On the other hand, the metadata of the ontology entity property B can be shown with no value shown, or alternatively no information regarding the ontology entity property B would be shown depending on the user role of the specific user.

3.5. Managing Ontology Entity Versions Across Multiple Object Databases

As discussed above, an ontology can include versions of ontology entities to track evolution of the objects and links over time. As each object or link is represented in at least one of the one or more object databases 206, each of the versions would be represented in each of the at least one object databases.

In some embodiments, the server 102 is programmed to associate each action with a new version. Each action can comprise multiple user edits to an ontology entity, and all the user edits would be accounted for in the next version of the ontology entity. In certain embodiments, to also accommodate data source updates, the server 102 is programmed to associate each merged dataset discussed above with a new version. All the changes to an ontology entity made in the actions incorporated into a merged dataset and all the changes corresponding to the data source updates incorporated into the merged dataset would be accounted for in the next version of the ontology entity. In other embodiments, the server 102 is programmed to allow configuration of how user edits or data source updates contribute to versions. For example, a user configuration can be to associate each time period with a new version such that all changes made to ontology entities during the time period would be accounted for in the next version.

In some embodiments, because different object databases can have different capabilities, writing data representing a new version of an ontology entity via a write request (e.g., an Action) in different object databases can take different amounts of time, amounting to potential synchronization issues. When an access request, such as a read request or another write request, is received before a specific version of an ontology entity is fully represented in all the relevant object databases, the server 102 can be programmed to follow different strategies in fulfilling the access request.

In some embodiments, in a first strategy, the server 102 is programmed to disallow reading a latest version until the latest version is fully represented in all the relevant object databases. This first strategy can avoid checking, in response to each read request, in which object databases a particular version is represented before selecting an object database to serve the particular version. In a second strategy, the server 102 is programmed to allow reading the latest version when the latest version is represented in at least one of the relevant object databases, such as the one considered as a canonical object database for the ontology entity. The latest version can be read soon as the latest version is represented or when a certain time has lapsed since the latest version is initially represented. This second strategy can avoid checking, in response to each read request, whether the newest version that can be served from an object database is the latest version provided to the object databases. Other strategies are possible depending on in which and how many object databases the latest version needs to be represented.

In some embodiments, in a third strategy, the server 102 is programmed to disallow writing a latest version until the immediately previous version is fully represented in all the relevant object databases. This third strategy can avoid skipping versions in the version history of each object database. In a fourth strategy, the server 102 is programmed to allow writing the latest version when the immediately previous version is represented in at least one of the relevant object databases, such as the one considered as a canonical object database for the ontology entity. This can be as soon as the immediately previous version is represented or when a certain time has lapsed since the immediately previous version is initially represented. This fourth strategy can avoid skipping versions in the version history of at least one object database and avoid delay in serving the latest version from the object databases for subsequent read access. Other strategies are possible depending on in which and how many object databases the immediately previous version needs to be represented.

FIG. 10 illustrates an example process of handling different access requests across different object databases over a time period using different strategies. In some embodiments, the server 102 can be programmed to track which versions are represented or the newest version represented in each object database, such as using the "database 1" column and the "database 2" column in FIG. 10. The server 102 can be programmed to track the newest version that can be served from the object databases using the first strategy, such as using the Avail1 column in FIG. 10, or the newest version that can be served from the object databases using the second strategy, such as using the Avail2 column in FIG. 10. The server 102 can be configured to update these columns before attending to the access requests.

In some embodiments, as illustrated in FIG. 10, at time T0, version 0 of an object is represented in both database 1 and database 2. The server is configured to determine that version 0 is available and represented in both databases, and thus the newest version that can be served using both the first strategy and the second strategy is version 0. A first write request to represent version 1 of the object is received. In response to the first write request, the server 102 can be configured to review the status that version 0 is represented in both databases and allow the representation of version 1 in the databases.

At time T1, version 1 of the object is represented in database 1 but not yet in database 2. The server 102 is configured to determine that the newest version that can be served using the first strategy is version 0 but the newest version that can be served using the second strategy requiring no time lapse is version 1. A first read request is received. In response to the first read request, the server 102 can be programmed to follow the first strategy and serve version 0 from any of database 1 and database 2. A second write request to represent version 2 of the object is received. In response to the second write request, the server 102 can be configured to follow the third strategy and disallow the representation of version 2 in the databases at this time. The server 102 can be programmed to further place the second write request in a queue so that the write requests would be processed in order. In other embodiments, the server 102 can be programmed to reject the second write request.

At time T2, version 1 of the object is represented in both database 1 database 2. The server 102 is configured to determine that the newest version that can be served using the first strategy and the second strategy is version 1. The server 102 is further configured to review the status that version 1 is represented in both databases and allow the representation of version 2 in the object databases, such as by dequeuing the second write request from the queue.

At T3, version 2 of the object is represented in database 1 but not yet in database 2. The server 102 is configured to determine that the newest version that can be served using the first strategy is version 1 but the newest version that can be served using the second strategy allowing no time lapse is version 2. A second read request is received. In response to the second read request, the server 102 can be programmed to follow the second strategy requiring no time lapse and serve version 2 from database 1. A third write request to represent version 3 of the object is received. In response to the third write request, the server 102 can be configured to follow the fourth strategy requiring no time lapse and allow the representation of version 3 in the object databases. The server 102 can be configured to additionally abort the representation of version 2 in database 2 once the representation of version 3 begins. In other embodiments, the server 102 can be programmed to proceed with the presentation of version 2 so that it is eventually represented in database 2.

At T4, version 3 of the object is represented in database 2 but not yet in database 1. The server 102 is configured to determine that the newest version that can be served using the first strategy is version 1 but the latest version available using the second strategy requiring no time lapse is version 3.

At T5, still version 3 of the object is represented in database 2 but still not yet in database 1. The server 102 is configured to determine that the latest version available using the first strategy is version 1 but the latest version available using the second strategy requiring one-unit time lapse is version 3. A third read request is received. In response to the third read request, the server 102 can be programmed to follow the second strategy requiring a one-unit time lapse and serve version 3 from database 2. A fourth write request to represent version 4 of the object is received. In response to the fourth write request, the server 102 can be configured to follow the fourth strategy requiring a one-unit time lapse and allow the representation of version 4 in the object databases.

In some embodiments, the server 102 is programmed to handle each access request in accordance with appropriate access privileges of users submitting or access requests. The server 102 can be programmed to receive multiple read requests or write requests related to the same object during the same time unit. These multiple access requests can be processed in some order and each of the access requests can be processed as discussed above.

In some embodiments, the server 102 is programmed to apply a first common strategy in response to all read requests and a second common strategy in response to all write requests at a given time point for the same object or link. The first common strategy or the second common strategy can be the same or different at different time points. The server 102 can be programmed to determine which strategy to apply depending on the object type, the user role, or other configurations.

In some embodiments, the server 102 is programmed to check the version of each ontology entity being edited in a write request. The server 102 can be programmed to process the write request only when the checked version is the latest version represented in the object databases for each ontology entity involved in the write request. Alternatively, the sever 102 can be programmed to process each write request and create a sub-version or a version branch based on the checked version. For example, when the checked version is 3 while the latest version represented in the object databases is 5, instead of representing a version 6, the server 102 can be configured to represent version 3.1.

3.6 Providing a Unified Ontology Query Interface Across Multiple Object Databases In some embodiments, the server 102 is programmed to support an API for querying an ontology. The API includes a group of functions, such as filters or aggregators, which are typically predicated on ontology entity properties. Different properties can support the same function. Certain functions apply to specific property types, such as a string or a number, and thus all properties of that property type across ontology entity types. Some functions apply to specific ontology entity types and thus additional ontology entity types that derive from the specific ontology entity types. The applicability of each function or other relevant information regarding the function can be recorded as metadata of the function. The API can enable the generation of an ontology entity set, such as an object set, through the use of filters. Each filter generally takes as an input a criterion to be satisfied by a property, thus filtering out those ontology entities having that property that does not satisfy the criterion. Each filter can also simply take a list of identifiers of ontology entities for retrieving the set of ontology entities identified by the list of identifiers. The API can also enable the generation of specific values through the use of aggregators. Each aggregator can be directly predicated on a property across all ontology entities or, after the property values are grouped into buckets, across all ontology entities in each bucket. Example aggregators include count( ), average( ), min( ), or max( ). Example grouping operators include top Values( ) to extract the top values of the property or by Year to group the property values by year.

As discussed above, each ontology entity type can be mapped to multiple object databases, where ontology entities of the ontology entity type are represented. Ontology entities of the ontology entity type can be represented in different ways in different object databases. As one example, in one object database, ontology data can be represented in an object-centric manner, while in another object database, links can also be represented as first-class citizens. As another example, in one object database, certain properties of the ontology entity type can be stored in a compressed form and thus generally unavailable for querying, while in another object database, some properties of the ontology entity type can all be stored as strings that are suitable for specific operations and thus can be operated on by specific functions.

In some embodiments, the server 102 is programmed to associate each object database with functional information that can be matched with metadata of the functions in the API for querying the ontology. As different functions can apply at different granularities, the functional information can be recorded at different granularities according to the mapping between ontology entity types and object databases. As one example, when an object database represents objects of an object type as rows and properties as columns, certain columns may be associated with functional information, which can be part of the column's metadata, such as that a column is of a specific data type, is compressed or otherwise not suitable for querying, or has corresponding indices. As another example, when an object database represents links of a link type as edges between nodes, the edges can be associated with functional information, which can be part of the edge's metadata, such as that an edge represents a link that can be directly queried.

In some embodiments, when a function is called, the server 102 is configured to determine which object databases to access to execute the function efficiently. The determination can depend on the ontology entity type on which the function is called, the nature of the function, or other factors, as further discussed below. The server 102 can be programmed to determine an ontology entity type on which the function operates or which the function takes as an input as part of the conventional process of executing a function. The server 102 can be programmed to further identify the set of object databases with which the ontology entity type is associated according to an existing mapping, and select at least one from the set of object databases to access.

In some embodiments, the server 102 can be programmed to perform the selection by matching the function's metadata with the functional information associated with the set of object databases, as discussed above and illustrated below. The server 102 can be programmed to perform the selection by further estimating the performance of the set of object databases in executing the function. The estimation can be performed by partially or selectively executing the function. For example, while the function is to obtain an aggregation over each of five groups, the estimation can be performed by obtaining an aggregation over one of the five groups. The server 102 can also be programmed to perform the selection according to a predetermined list of priorities assigned to the set of object databases. The assignment can be performed based on the number of properties the representation of which is suitable for querying in an object database, the number of properties that are indexed in an object database, the historical frequency of use for an object database, or other factors. In other embodiments, the server 102 can be programmed to perform the selection by considering multiple functions simultaneously. For example, an object database can serve multiple functions being called can be preferred to another object database that can serve only one of the functions being called based on reduced overhead associated with database access.

In some embodiments, upon selecting an object database, the server 102 is programmed to access the object database and retrieve a piece of data in executing the function based on the transformation from the definition for the ontology entity type on which the function is called to the schema for the object database. Depending on the nature of the function, the server 102 can be programmed to retrieve one or more pieces of data from one or more object databases in executing the function. The server 102 is further programmed to transform the combination of the one or more pieces of data back into ontology data in response to the function call. When the retrieval is unsuccessful, the server 102 can be programmed to re-select another object database from the set of object databases.

FIG. 12 illustrates examples calls to the API for querying an ontology. In the set of function 1202, the Objects.search( ) function in the API can be used to specify a query. The invocation of this function is followed by the invocation of a function that corresponds to an ontology entity type, such as a flight object type that corresponds to a flight, to specify the return type of the query. All ontology entity types can support the filter( ) function that implements a filter, which means that the filter( ) function can operate on all ontology entity types. The flight object type has a property of departureAirportCode, which corresponds to the departure airport code of a flight. All properties can support the exactMatch( ) function as one of the matching functions. The exactMatch( ) function thus operates on a property of an ontology entity and takes a value or anther property as an input. Therefore, in the set of function 1202, the filter( ) function is requesting the set of flight objects, where the departureAirportCode has a value of airportCode, to look for the set of flights that depart from the airport having an airport code of airportCode. The searchAround functionality enables traversing links, and a corresponding function can be created for each link type. A flight object type can be linked to a passenger object type that corresponds to a passenger of the flight. The searchAroundPassengers( ) function thus operates on an ontology entity type that has links to the passenger object type and, when invoked on a flight object, finds all the passenger objects linked to the flight object. Therefore, the set of function calls 1202 returns the set of passenger objects that are linked to the set of flight objects returned by the filter( ) function, that correspond to the set of passengers of these flights.

In some embodiments, to execute the set of functions 1202, the server 102 is programmed to first identify the set of flight objects that satisfy the filter criterion and then identify the set of passenger objects that are linked to the set of flight objects. For the first identification, the exactMatch( ) function operates on or takes as an input a property value. The server 102 can thus be programmed to determine an object database for the flight object type that enables fast retrieval based on a particular property value of an object.

The server 102 can be further programmed to detect that a particular object database is a relational database that has an index on the column representing the departure AirportCode property and select the particular object database. For the second identification, the searchAround functionality operates on links. The server 102 can thus be programmed to determine an object database for the flight object type that allows efficient traversal of links connecting flight objects with passenger objects. The server 102 can be programmed to detect that a certain object database is a graph database that represents links between flight objects and passenger objects as edges and select the certain object database. Finally, in response to the set of function calls 1202, the server 102 is configured to return the result of the second identification.

In the set of function 1204, the Objects.search( ) and filter( ) functions in the API to query the ontology have been discussed above. The building object type has a property of maxOccupancy, which corresponds to the maximum occupancy of the building, and a property of inFloodZone, which corresponds to an indication of whether the building is in a flood zone. The Filters.and( ) function in the API can be used to combine filters using the and logical operator, which takes two Boolean expressions as inputs. In this case, the first Boolean expression is building.maxOccupancy.gt(100) to indicate whether the building's maximum occupancy is greater than 100 people. The second Boolean expression is building.inFloodZone.isTrue( ), which indicates whether the building is in a flood zone. Therefore, the set of function 1204 returns the set of building objects that are returned by the filter( ) function.

In some embodiments, to execute the set of functions 1204, the server 102 is programmed to identify the set of building objects that satisfy the filter criterion, which is a combination of two filter criteria. The two filter criteria involve different functions, but both gt( ) and isTrue( ) operate on or take as an input a property value. The two filter criteria can lead to access to different object databases even if they apply to the same building object type. In this case, the maxOccupancy property can be a property that is specific to the building object type or is commonly accessed, while the inFloodZone can be a property that is inherited from a related ontology entity type, such as a geoArea object type, and not commonly accessed. Furthermore, a first object database can store a subset of the properties of building objects that are commonly accessed in uncompressed form in hot storage and the remaining properties in archived form in cold storage. A second object database can be created to specifically serve geospatial queries and have specific indices for relevant properties, including the inFloodZone property of the building objects. The server 102 is thus programmed to detect that the maxOccupancy property can be efficiently queried in the first object database and select that object database to acquire a first set of building objects that satisfy the first filter criterion. The server 102 is programmed to then detect that the inFloodZone property can be efficiently queried in the second object database and select that object database to acquire a second set of building objects that satisfy the second filter criterion. Finally, in response to the set of function 1204, the server 102 is configured to return the intersection of the first set of building objects and the second set of building objects.

In some embodiments, in executing a function call, the server 102 is programmed to consider data availability in an object database, which can vary depending on the versioning strategy, as discussed in Section 3.5. The function calls discussed herein would correspond to the read requests discussed above. Sometimes, the versioning strategy allows a latest version of an ontology entity of an ontology entity type to be accessed even when the latest version is not yet represented in all the object databases associated with the ontology entity type. The server 102 thus can be programmed to track the list of object databases where the latest version is available, which limits the choices of object databases in executing a function all.

In some embodiments, in executing a function call, the server 102 is programmed to also consider data access control in the ontology, which can vary depending on properties of ontology entities and attributes of user accounts, as discussed in Section 3.4. The server 102 is programmed to determine whether the user accounts instructing executing the function has permission to access each ontology entity on which the function operates, and such permission would generally apply to all the object databases associated with the corresponding ontology entity type. In certain embodiments, the functions themselves can be associated with access control, so permissions can be determined before a function is applied to any ontology entity type. For example, access to fuzzy filters that allow fuzzy matching could be granted to only user accounts that are associated with more than a certain amount of experience, regardless of which ontology entities are to be fuzzy matched. Among the set of user accounts that are allowed to use the fuzzy filters, granular security policies can then further determine which user accounts can have read or view access to the ontology entities being fuzzy matched. Generally, any portion of an ontology entity that is not accessible to a user account becomes a null value to the user account.

4. Example Processes

Each of FIGS. 7-9, 11, and 13 is shown in simplified, schematic format for purposes of illustrating a clear example and other embodiments may include more, fewer, or different elements connected in various manners. Each of FIGS. 7-9, 11, and 13 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 7 illustrates an example process of indexing data changes to ontology-based databases in accordance with disclosed embodiments.

In some embodiments, the server 102 is programmed or configured to represent a data source of one or more data sources by a dataset of the one or more datasets. The server 102 is programmed or configured to then add a record to the first mapping that associates the dataset with one or more ontology entity types of the plurality of ontology entity types, and create a transformation between a schema for the dataset and the one or more definitions for the one or more ontology entity types. In addition, the server 102 is programmed or configured to generate one or more ontology entities from the dataset using the transformation.

In step 702, the server 102 is programmed or configured to receive a set of data source updates for one or more datasets from the one or more data sources. In some embodiments, the server 102 is programmed or configured to receive original data from the data source, determine changes to the dataset from the original data, and add the changes to a changelog dataset that represents the set of data source updates.

In step 704, the server 102 is programmed or configured to receive one or more sets of user edits to an ontology. The ontology includes a definition for each ontology entity type of a plurality of ontology entity types and a plurality of ontology entities instantiated from the plurality of ontology entity types. At least one ontology entity of the plurality of ontology entities is represented in multiple forms respectively in multiple object databases of a plurality of object databases.

In some embodiments, an ontology entity is an object or a link between two objects. In certain embodiments, a user edit of the one or more sets of user edits is a change to an ontology entity of the set of ontology entities. Each set of user edits of the one or more sets of user edits is to be applied as a single transaction to a user.

In step 706, the server 102 is programmed or configured to transform the set of data source updates to a list of updates to the ontology based on a first mapping between the one or more datasets and the plurality of ontology entity types. In some embodiments, multiple datasets of the one or more datasets are mapped to a common ontology entity type in the first mapping.

In step 708, the server 102 is programmed or configured to merge the list of updates to the ontology with the one or more sets of user edits into a merged dataset. In some embodiments, the merging comprises joining the changelog dataset noted above and the one or more sets of user edits based on a primary key of a certain ontology entity. The merging further comprises storing the merged dataset in a memory, thereby materializing the one or more sets of user edits. In certain embodiments, the merging is performed when a size of the list of updates or a size of the one or more sets of user edits has exceeded a threshold or when a certain amount of time has passed.

In step 710, the server 102 is programmed or configured to generate index data from the merged dataset for one or more object databases of the plurality of object databases based on a second mapping between the plurality of ontology entity types and the plurality of object databases. In some embodiments, the plurality of object databases includes a graph database and a relational database respectively associated with different data representations and query operations. In certain embodiments, the second mapping associates each ontology entity type with at least one object database of the plurality of object databases.

In some embodiments, the merged dataset includes changes to one or more ontology entities of a set of ontology entity types of the plurality of ontology entity types. The generating comprises, for a specific object database of the plurality of object databases, creating one or more index files from the changes to the one or more ontology entities for the set of ontology entity types that are associated with the specific object database, and the one or more index files are in a specific format required by the specific object database. In certain embodiments, each ontology entity type of the plurality of ontology entity types has one or more properties. The index data associates a value for a property of an ontology entity type of the plurality of ontology entity types with a list of ontology entities of the set of ontology entities.

In step 712, the server 102 is programmed or configured to transmit the index data to the one or more object databases.

Figure 8:
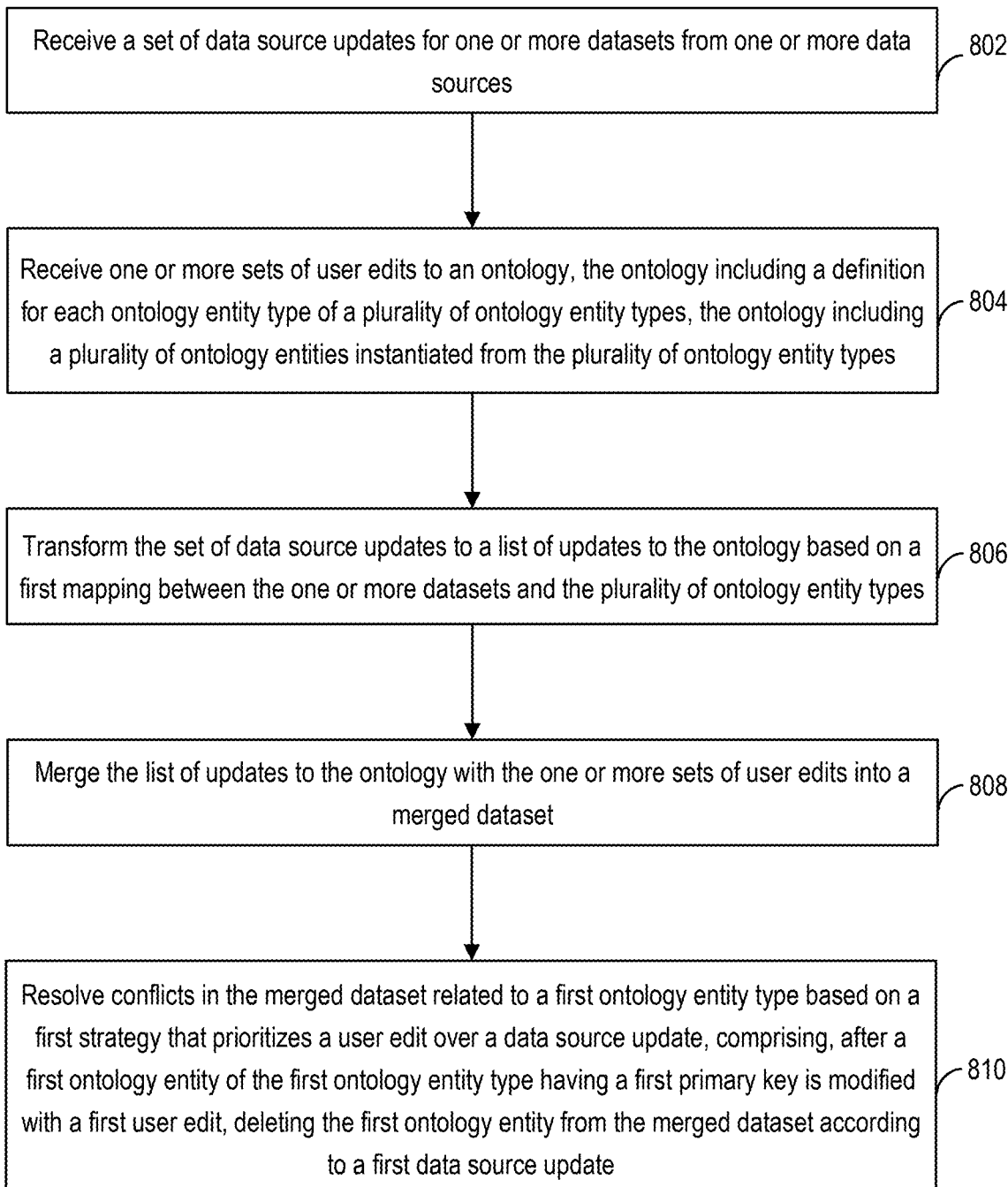
FIG. 8 illustrates a process of resolving conflicts in changes to ontology data in accordance with disclosed embodiments.

FIG. 8 illustrates a process of resolving conflicts in changes to ontology data in accordance with disclosed embodiments.

In step 802, the server 102 is programmed or configured to receive a set of data source updates for one or more datasets from one or more data sources.

In step 804, the server 102 is programmed or configured to receive one or more sets of user edits to an ontology. The ontology includes a definition for each ontology entity type of a plurality of ontology entity types and a plurality of ontology entities instantiated from the plurality of ontology entity types. In some embodiments, an ontology entity is an object or a link between two objects. In certain embodiments, at least one ontology entity of the plurality of ontology entities is represented in multiple forms respectively in multiple object databases of a plurality of object databases.

In step 806, In step 802, the server 102 is programmed or configured to transform the set of data source updates to a list of updates to the ontology based on a first mapping between the one or more datasets and the plurality of ontology entity types.

In step 808, In step 802, the server 102 is programmed or configured to merge the list of updates to the ontology with the one or more sets of user edits into a merged dataset. In some embodiments, the merging is performed when a size of the list of updates to the ontology or a size of the one or more sets of user edits has exceeded a threshold or when a certain amount of time has passed.

In step 810, In step 802, the server 102 is programmed or configured to resolve conflicts in the merged dataset related to a first ontology entity type based on a first strategy that prioritizes a user edit over a data source update, comprising, after a first ontology entity of the first ontology entity type having a first primary key is modified with a first user edit, deleting the first ontology entity from the merged dataset according to a first data source update.

In some embodiments, the resolving further comprising after the deleting, recreating the first ontology entity having the first primary key according a second data source update in the merged dataset, and reapplying the first user edit to the first ontology entity. In certain embodiments, the server 102 is programmed to resolve conflicts in the merged dataset related to each ontology entity type that is a sub-type of the first ontology entity type based on the first strategy. In other embodiments, the server 102 is programmed to resolve conflicts in the merged dataset related to a second ontology entity type based on a second strategy that prioritizes a more recent change to the ontology over a less recent change.

In some embodiments, the server 102 is programmed to resolve conflicts in the merged dataset related to a second ontology entity type by reviewing data in the merged dataset in a chronological order. The server 102 is further programmed to determine that a current user edit to a second ontology entity of the second ontology entity type in the merged dataset is to delete the second ontology entity, and delete the second ontology entity from the merged dataset based on the first strategy.

In some embodiments, the server 102 is further programmed to determine that a current user edit to a third ontology entity of the second ontology entity type in the merged dataset is to create the third ontology entity and an earlier user edit to the third ontology entity was to delete the third ontology entity, and disregard any later data source update to the third ontology entity in the merged dataset.

In some embodiments, the server 102 is further programmed to determine that a current user edit to a fourth ontology entity of the second ontology entity type in the merged dataset is to create the fourth ontology entity and no earlier user edit to the fourth ontology entity was to delete the fourth ontology entity, and disregard any later data source update to the fourth ontology entity in the merged dataset.

In some embodiments, the server 102 is further programmed to determine that a current user edit to a fifth ontology entity of the second ontology entity type in the merged dataset is to modify a property of the fifth ontology entity, no earlier user edit to the fifth ontology entity was to create the fifth ontology entity, and the fifth ontology entity is represented in the one or more datasets, and disregard any later data source update to modify the property of the fifth ontology entity in the merged dataset.

In some embodiments, the server 102 is further programmed to determine that a current user edit to a sixth ontology entity of the second ontology entity type in the merged dataset is to modify a property of the sixth ontology entity, no earlier user edit to the sixth ontology entity was to create the sixth ontology entity, and the sixth ontology entity is not represented in the one or more datasets, and reject the current user edit.

FIG. 9 illustrates a process of managing access control for ontology data in accordance with disclosed embodiments.

In step 902, the server 102 is programmed or configured to receive a set of data source updates for one or more datasets from one or more data sources.

In step 904, the server 102 is programmed or configured to transform the set of data source updates to a list of updates to an ontology based on a first mapping. The ontology includes a definition for each ontology entity type of a plurality of ontology entity types, the definition including one or more properties. The ontology also includes a plurality of ontology entities instantiated from the plurality of ontology entity types. The first mapping is between the one or more datasets and the plurality of ontology entity types. In some embodiments, an ontology entity is an object or a link between two objects.

In some embodiments, the server 102 is programmed to represent a data source of the one or more data sources by a dataset of the one or more datasets. The server 102 is also programmed to add a record to the first mapping that associates the dataset with one or more ontology entity types of the plurality of ontology entity types, and create a transformation between a schema for the dataset and one or more definitions for the one or more ontology entity types. In addition, the server 102 is programmed to generate one or more ontology entities from the dataset using the transformation.

In step 906, the server 102 is programmed or configured to manage a set of user accounts of a user account type having one or more attributes. In some embodiments, a specific attribute of the one or more attributes of the user account type corresponds to a user role of plurality of user roles. Each user role is associated with a distinct set of discovering, reading, writing, or administering permissions.

In some embodiments, the server 102 is programmed to receive, for the dataset, a set of permissions controlling access to rows of the dataset by the set of user accounts. The server 102 is also programmed to create a specific security policy that applies to ontology entities of the one or more ontology entity types based on the set of permissions. In certain embodiments, the providing comprises applying the specific security policy before applying the first security policy.

In some embodiments, the server 102 is programmed to create a first transformation mapping columns of a first dataset of the one or more datasets to a first set of properties of a certain ontology entity type of the plurality of ontology entity types, and create a second transformation mapping columns of a second dataset of the one or more datasets to a second set of properties of the certain ontology entity type. The server is programmed to then create a specific security policy that applies to the first set of properties of ontology entities of the certain ontology entity type based on a first set of permissions controlling access to rows of the first dataset by the set of user accounts, and create a particular security policy that applies to the second set of properties of the ontology entities of the certain ontology entity type based on a second set of permissions controlling access to rows of the second dataset by the set of user accounts.

In step 908, the server 102 is programmed or configured to cause presenting a first option to create a rule by choosing two items from an attribute of the user account type, a property of an ontology entity type, and a value, and a second option to combine a plurality of rules by choosing a logical operator from a plurality of logical operators. In some embodiments, the server 102 is programmed to cause presenting a third option to combine the two items by choosing a relational operator from a plurality of relational operators. In certain embodiments, the server 102 is programmed to cause presenting a fourth option to associate one or more permissions with the rule that are granted when the rule applies. In other embodiments, the one or more permissions allow no access to a first property of a specific ontology entity type of the plurality of ontology entity types and allowing access to a second property of the specific ontology entity type.

In step 910, the server 102 is programmed or configured to create a first security policy based on input data received via the first option and the second option. In some embodiments, the creating comprises determining a scope of each rule in the plurality of rules based on the associated one or more permissions, and determining a scope of the plurality of rules in combination based on the scope of each rule and the logical operator.

In step 912, the server 102 is programmed or configured to provide access to the ontology to user accounts according to the first security policy.

In some embodiments, the list of updates to the ontology includes a list of changes to at least one ontology entity of the plurality of ontology entities. The server 102 is further programmed to, for an ontology entity of the at least one ontology entity, represent the list of updates that applies to the ontology entity in multiple forms to generate multiple representations respectively in multiple object databases. The providing then comprises applying the first security policy equally to the multiple representations.

FIG. 11 illustrates a process of managing versioning of ontology data represented in multiple forms respectively in multiple databases in accordance with disclosed embodiments.

In step 1102, the server 102 is programmed or configured to manage an ontology including a definition for each ontology entity type of a plurality of ontology entity types and a plurality of ontology entities instantiated from the plurality of ontology entity types. A first ontology entity of the plurality of ontology entities is represented in multiple forms respectively in a first group of object databases of a plurality of object databases. A current version of the first ontology entity is represented in all object databases of the first group of object databases.

In step 1104, the server 102 is programmed or configured to start, at a first time, representation of a first new version of the first ontology entity in each object database of the first group of object databases.

In step 1106, the server 102 is programmed or configured to receive, at a second time after the first time, a first read request to read the first ontology entity.

In step 1108, the server 102 is programmed or configured to determine, at the second time, that the representation of the first new version of the first ontology entity is completed in a first object database of the first group of object databases but not a second object database of the first group of object databases.

In step 1110, the server 102 is programmed or configured to return the current version of the first ontology entity in response to the first read request.

In step 1112, the server 102 is programmed or configured to receive, at a third time after the second time, a second read request to read the first ontology entity.

In step 1114, the server 102 is programmed or configured to determine, at the third time, that the representation of the first new version of the first ontology entity is completed in the first object database and a difference between the third time and the second time exceeds a threshold.

In step 1116, the server 102 is programmed or configured to return the first new version of the first ontology entity in response to the second read request.

In some embodiments, the managing the ontology comprises responding to all read requests to read ontology entities of a first ontology entity type from which the first ontology entity is instantiated according to a first common strategy and all write requests to write ontology entities of the first ontology entity type according to a second common strategy. The returning of the first new version of the first ontology entity in response to the second read request is performed according to the first common strategy.

In some embodiments, a second ontology entity of the plurality of ontology entities is represented in multiple forms respectively in a second group of object databases of the plurality of object databases. A current version of the second ontology entity is represented in all object databases of the second group of object databases. The server 102 is programmed to start, at a fourth time, representation of a first new version of the second ontology entity in each object database of the second group of object databases. The server 102 is programmed to then receive, at a fifth time after the fourth time, a third read request to read the second ontology entity, determine, at the fifth time, that the representation of the first new version of the second ontology entity is completed in a third object database of the second group of object databases but not a fourth object database of the second group of object databases, and return the first new version of the second ontology entity in response to the third read request.

In some embodiments, a third ontology entity of the plurality of ontology entities is represented in multiple forms respectively in a third group of object databases of the plurality of object databases. A current version of the third ontology entity is represented in all object databases of the second group of object databases. The server 102 is programmed to start, at a fourth time, representation of a first new version of the third ontology entity in each object database of the second group of object databases. The server 102 is programmed to then receive, at a fifth time after the fourth time, a first write request to write a second new version of the third ontology entity, determine, at the fifth time, that the representation of the first new version of the third ontology entity is completed in a third object database of the third group of object databases but not a fourth object database of the third group of object databases, and queue, at the fifth time, the first write request. In certain embodiments, the server 102 is programmed to determine, at a sixth time after the fifth time, that the representation of the first new version of the third ontology entity is completed in the third object database and a difference between the sixth time and the fifth time exceeds a second threshold. The server 102 is programmed to then, at the sixth time, dequeue the first write request and start representation of the second new version of the third ontology entity in each object database of the third group of object databases.

In some embodiments, a fourth ontology entity of the plurality of ontology entities is represented in multiple forms respectively in a fourth group of object databases of the plurality of object databases. A current version of the fourth ontology entity is represented in all object databases of the second group of object databases. The server 102 is programmed to start, at a seventh time, representation of a first new version of the fourth ontology entity in each object database of the fourth group of object databases. The server is programmed to then receive, at an eighth time after the seventh time, a second write request to write a second new version of the fourth ontology entity, determine, at the eighth time, that the representation of the first new version of the fourth ontology entity is completed in a fifth object database of the fourth group of object databases but not a sixth object database of the fourth group of object databases, and start, at the eighth time, representation of the second new version of the fourth ontology entity in each object database of the fourth group of object databases in response to the second write request. In certain embodiments, the server 102 is programmed to terminate representation of the first new version of the fourth ontology entity in the sixth object database.

In some embodiments, the ontology further includes a mapping associating each ontology entity type of the plurality of ontology entity types with one or more object databases of the plurality of object databases, including associating a first ontology entity type from which the first ontology entity is instantiated with the first group of object databases. In certain embodiments, the mapping further associates a fifth ontology entity type from which a fifth ontology entity is instantiated with a fifth group of object databases and designates a particular object database of the fifth group of object databases as a canonical object database for the fifth ontology entity type. A current version of the fifth ontology entity being represented in all object databases of the fifth group of object databases. The server 102 is programmed to start, at a ninth time, representation of a first new version of the fifth ontology entity in each object database of the fifth group of object databases. The server 102 is programmed to then receive, at a tenth time after the ninth time, a fourth read request to read the fifth ontology entity, determine, at the tenth time, that the representation of the first new version of the fifth ontology entity is not completed in the canonical object database for the fifth ontology entity type, and return the current version of the fifth ontology entity in response to the fourth read request.

In some embodiments, a sixth ontology entity of the plurality of ontology entities is represented in multiple forms respectively in a sixth group of object databases of the plurality of object databases. A current version of the sixth ontology entity is represented in all object databases of the sixth group of object databases. The server is programmed to receive, at a fourth time, a third write request to write a first new version of the sixth ontology entity, determine that the first new version of the sixth ontology entity is an update to a specific version of the sixth ontology entity older the current version of the sixth ontology entity, and reject the third write request.

In some embodiments, the server 102 is programmed to receive a set of data source updates for one or more datasets from one or more data sources, and receive one or more sets of user edits to the ontology. The server 102 is programmed to transform the set of data source updates to a set of changes to the ontology based on a first mapping between the one or more data sources and the plurality of ontology entity types. The server 102 is programmed to then merge the set of changes to the ontology with the one or more sets of user edits to obtain a merged dataset, the merged dataset including a representation of the first new version of the first ontology entity. In addition, the server 102 is programmed to generate index data for one or more object databases of the plurality of object databases based on a second mapping between the plurality of ontology entity types and the plurality of object databases, and transmit the index data to the one or more object databases. In certain embodiments, a user edit of the one or more sets of user edits is a change to an ontology entity of the plurality of ontology entities. Each set of user edits of the one or more sets of user edits leads to a single new version of an ontology entity.

FIG. 13 illustrates a process of providing a unified query interface across multiple databases in accordance with disclosed embodiments.

In step 1302, the server 102 is programmed or configured to receive a set of calls of a set of functions in an API for querying an ontology. The ontology includes a definition for each ontology entity type of a plurality of ontology entity types and a plurality of ontology entities instantiated from the plurality of ontology entity types. Each ontology entity type of the plurality of ontology entity types has one or more properties. In certain embodiments, an ontology entity is an object or a link between two objects. In some embodiments, the set of functions includes a filter that operates on an ontology entity type and returns a set of ontology entities of the ontology entity type.

In step 1304, the server 102 is programmed or configured to determine a set of properties of a first ontology entity type of the plurality of ontology entity types, the set of properties to be accessed in executing the set of functions.

In step 1306, the server 102 is programmed or configured to identify a first group of object databases associated with the first ontology entity type. The first ontology entity type is represented in multiple forms separately in the first group of object databases.

In some embodiments, the server 102 is programmed to perform the identifying based on a certain mapping that associates the first ontology entity type with the first group of object databases and includes a transformation between the definition for the first ontology entity type and schemas for the first group of object databases.

In certain embodiments, a first object database of the first group of object databases is a relational database representing an ontology entity of the first ontology entity type as a row and properties of the ontology entity as columns, and a second object database of the first group of object databases is a graph database representing the ontology entity as a node and links connected to the ontology entity as edges. In other embodiments, a first object database of the first group of object databases represents a particular property of the set of properties of the first ontology entity type in uncompressed or indexed form, and a second object database of the first group of object databases represents the particular property in archived or encrypted form.

In step 1308, the server 102 is programmed or configured to select a specific object database from the first group of object databases based on functional information of the specific object database related to representation of the set of properties of the first ontology entity type.

In some embodiments, the server 102 is programmed to match the functional information of the specific object database with metadata of a particular function of the set of functions, where the functional information indicates that a column of the specific object database allows random and near real-time access, and the column corresponds to a property of the set of properties of the first ontology entity type. In certain embodiments, the server 102 is configured to estimate a performance of each object database of the first group of object databases in serving a call to a particular function of the set of functions by limiting an amount of data to be returned from calling the particular function. In other embodiments, the server 102 is configured to confirm that the specific object database has a latest version of an ontology entity of the first ontology entity type that is available for querying.

In step 1310, the server 102 is programmed or configured to execute the set of functions using the specific object database. In some embodiments, the server 102 is programmed to access distinct object databases of the first group of object databases to access distinct properties of the first ontology entity type, and merge results of accessing the distinct object databases. In certain embodiments, the server 102 is configured to transform data retrieved from the specific object database to data of the ontology.

In step 1312, the server 102 is programmed or configured to return a result of the executing in response to the set of calls.

In some embodiments, the server 102 is programmed to identify a user account associated with the set of calls, and verify that the user account has permission to access the specific object database in executing the set of functions.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 14:
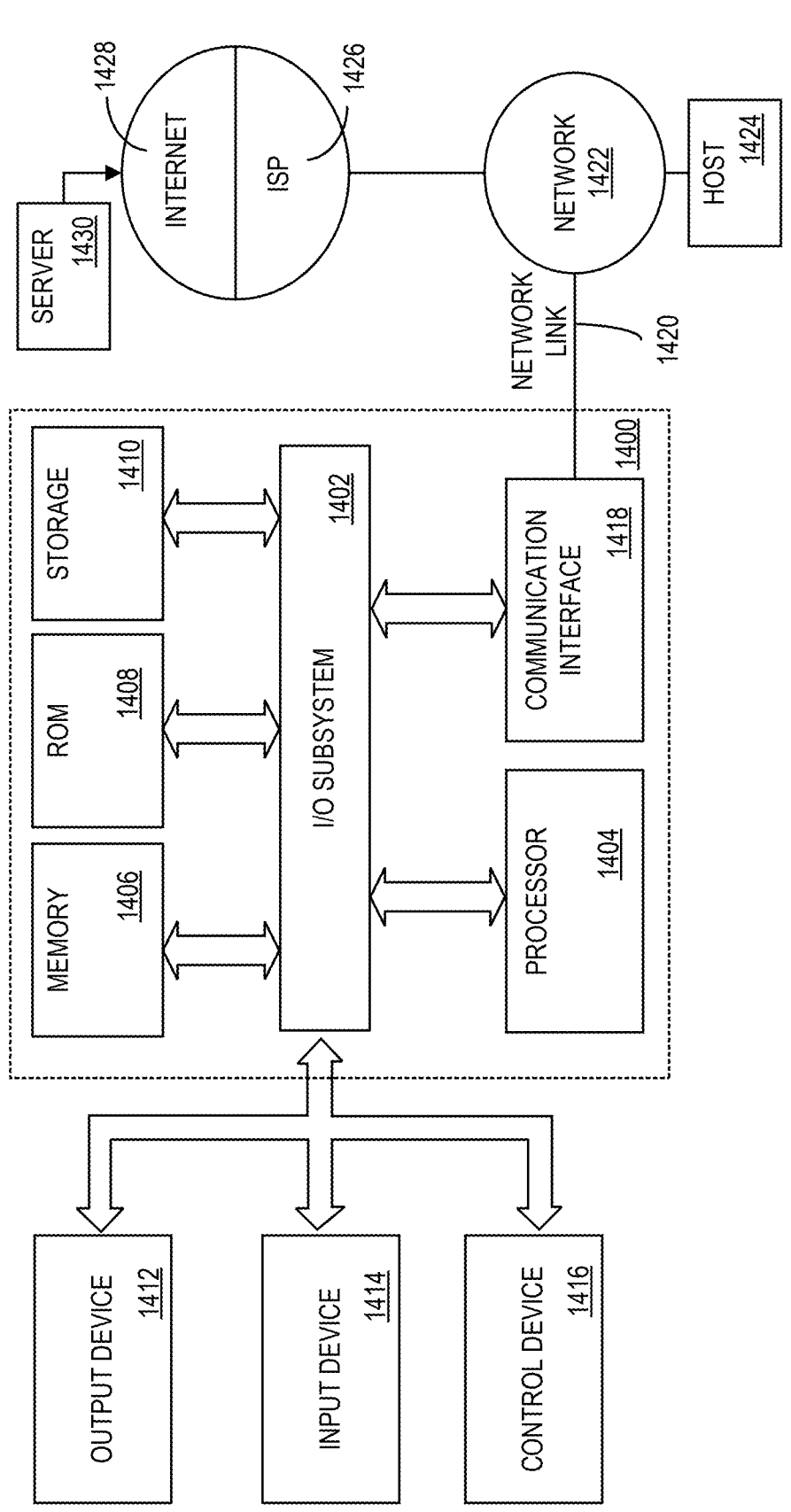
FIG. 14 illustrates a computer system upon which various embodiments may be implemented.

FIG. 14 is a block diagram that illustrates an example computer system with which an embodiment may be implemented. In the example of FIG. 14, a computer system 1400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1400 includes an input/output (I/O) subsystem 1402 which may include a bus and/or other communication mechanism(s) for communicating information and/or instructions between the components of the computer system 1400 over electronic signal paths. The I/O subsystem 1402 may include an I/O controller, a memory controller and at least one I/O port. The electronic signal paths are represented schematically in the drawings, for example as lines, unidirectional arrows, or bidirectional arrows.

At least one hardware processor 1404 is coupled to I/O subsystem 1402 for processing information and instructions. Hardware processor 1404 may include, for example, a general-purpose microprocessor or microcontroller and/or a special-purpose microprocessor such as an embedded system or a graphics processing unit (GPU) or a digital signal processor or Advanced RISC Machines (ARM) processor. Processor 1404 may comprise an integrated arithmetic logic unit (ALU) or may be coupled to a separate ALU.

Computer system 1400 includes one or more units of memory 1406, such as a main memory, which is coupled to I/O subsystem 1402 for electronically digitally storing data and instructions to be executed by processor 1404. Memory 1406 may include volatile memory such as various forms of random-access memory (RAM) or other dynamic storage device. Memory 1406 also may be used for storing temporary variables or other intermediate information during execution of instructions to be executed by processor 1404. Such instructions, when stored in non-transitory computer-readable storage media accessible to processor 1404, can render computer system 1400 into a special-purpose machine that is customized to perform the operations specified in the instructions.

Computer system 1400 further includes non-volatile memory such as read only memory (ROM) 1408 or other static storage device coupled to I/O subsystem 1402 for storing information and instructions for processor 1404. The ROM 1408 may include various forms of programmable ROM (PROM) such as erasable PROM (EPROM) or electrically erasable PROM (EEPROM). A unit of persistent storage 1410 may include various forms of non-volatile RAM (NVRAM), such as flash memory, or solid-state storage, magnetic disk, or optical disk such as CD-ROM or DVD-ROM, and may be coupled to I/O subsystem 1402 for storing information and instructions. Storage 1410 is an example of a non-transitory computer-readable medium that may be used to store instructions and data which when executed by the processor 1404 cause performing computer-implemented methods to execute the techniques herein.

The instructions in memory 1406, ROM 1408 or storage 1410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 1400 may be coupled via I/O subsystem 1402 to at least one output device 1412. In one embodiment, output device 1412 is a digital computer display. Examples of a display that may be used in various embodiments include a touch screen display or a light-emitting diode (LED) display or a liquid crystal display (LCD) or an e-paper display. Computer system 1400 may include other type(s) of output devices 1412, alternatively or in addition to a display device. Examples of other output devices 1412 include printers, ticket printers, plotters, projectors, sound cards or video cards, speakers, buzzers or piezoelectric devices or other audible devices, lamps or LED or LCD indicators, haptic devices, actuators, or servos.

At least one input device 1414 is coupled to I/O subsystem 1402 for communicating signals, data, command selections or gestures to processor 1404. Examples of input devices 1414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1416, which may perform cursor control or other automated control functions such as navigation in a graphical interface on a display screen, alternatively or in addition to input functions. Control device 1416 may be a touchpad, a mouse, a trackball, or cursor direction keys for communicating direction information and command selections to processor 1404 and for controlling cursor movement on the output device 1412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1414 may include a combination of multiple different input devices, such as a video camera and a depth sensor.

In another embodiment, computer system 1400 may comprise an internet of things (IoT) device in which one or more of the output device 1412, input device 1414, and control device 1416 are omitted. Or, in such an embodiment, the input device 1414 may comprise one or more cameras, motion detectors, thermometers, microphones, seismic detectors, other sensors or detectors, measurement devices or encoders and the output device 1412 may comprise a special-purpose display such as a single-line LED or LCD display, one or more indicators, a display panel, a meter, a valve, a solenoid, an actuator or a servo.

When computer system 1400 is a mobile computing device, input device 1414 may comprise a global positioning system (GPS) receiver coupled to a GPS module that is capable of triangulating to a plurality of GPS satellites, determining and generating geo-location or position data such as latitude-longitude values for a geophysical location of the computer system 1400. Output device 1412 may include hardware, software, firmware, and interfaces for generating position reporting packets, notifications, pulse or heartbeat signals, or other recurring data transmissions that specify a position of the computer system 1400, alone or in combination with other application-specific data, directed toward host computer 1424 or server 1430.

Computer system 1400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1400 in response to processor 1404 executing at least one sequence of at least one instruction contained in main memory 1406. Such instructions may be read into main memory 1406 from another storage medium, such as storage 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 1410. Volatile media includes dynamic memory, such as memory 1406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1402. Transmission media can also take the form of acoustic or light waves, such as those generated during radio-wave and infra-red data communications.

Various forms of media may be involved in carrying at least one sequence of at least one instruction to processor 1404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1400 can receive the data on the communication link and convert the data to be read by computer system 1400. For instance, a receiver such as a radio frequency antenna or an infrared detector can receive the data carried in a wireless or optical signal and appropriate circuitry can provide the data to I/O subsystem 1402 such as place the data on a bus. I/O subsystem 1402 carries the data to memory 1406, from which processor 1404 retrieves and executes the instructions. The instructions received by memory 1406 may optionally be stored on storage 1410 either before or after execution by processor 1404.

Computer system 1400 also includes a communication interface 1418 coupled to I/O subsystem 1402. Communication interface 1418 provides a two-way data communication coupling to network link(s) 1420 that are directly or indirectly connected to at least one communication network, such as a network 1422 or a public or private cloud on the Internet. For example, communication interface 1418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1422 broadly represents a LAN, WAN, campus network, internetwork, or any combination thereof. Communication interface 1418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1418 sends and receives electrical, electromagnetic, or optical signals over signal paths that carry digital data streams representing various types of information.

Network link 1420 typically provides electrical, electromagnetic, or optical data communication directly or through at least one network to other data devices, using, for example, satellite, cellular, Wi-Fi, or BLUETOOTH technology. For example, network link 1420 may provide a connection through a network 1422 to a host computer 1424.

Furthermore, network link 1420 may provide a connection through network 1422 or to other computing devices via internetworking devices and/or computers that are operated by an Internet Service Provider (ISP) 1426. ISP 1426 provides data communication services through a world-wide packet data communication network represented as internet 1428. A server 1430 may be coupled to internet 1428. Server 1430 broadly represents any computer, data center, virtual machine, or virtual computing instance with or without a hypervisor, or computer executing a containerized program system such as DOCKER or KUBERNETES. Server 1430 may represent an electronic digital service that is implemented using more than one computer or instance and that is accessed and used by transmitting web services requests, Uniform Resource Locator (URL) strings with parameters in HTTP payloads, API calls, app services calls, or other service calls. Computer system 1400 and server 1430 may form elements of a distributed computing system that includes other computers, a processing cluster, server farm or other organization of computers that cooperate to perform tasks or execute applications or services. Server 1430 may comprise one or more sets of instructions that are organized as modules, methods, objects, functions, routines, or calls.

The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 1430 may comprise a web application server that hosts a presentation layer, application layer and data storage layer such as a relational database system using SQL or NoSQL, an object store, a graph database, a flat file system or other data storage.

Computer system 1400 can send messages and receive data and instructions, including program code, through the network(s), network link 1420 and communication interface 1418. In the Internet example, a server 1430 might transmit a requested code for an application program through Internet 1428, ISP 1426, local network 1422 and communication interface 1418. The received code may be executed by processor 1404 as it is received, and/or stored in storage 1410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1404. While each processor 1404 or core of the processor executes a single task at a time, computer system 1400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of providing a unified query interface across multiple object databases, comprising:

receiving a set of calls of a set of functions in an application programming interface (API) for querying an ontology, the ontology including a definition for each ontology entity type of a plurality of ontology entity types and a plurality of ontology entities instantiated from the plurality of ontology entity types, each ontology entity type of the plurality of ontology entity types having one or more properties;

determining a set of properties of a first ontology entity type of the plurality of ontology entity types, the set of properties to be accessed in executing the set of functions;

identifying a first group of object databases associated with the first ontology entity type, the first ontology entity type being represented in multiple forms separately in the first group of object databases;

selecting a specific object database from the first group of object databases based on functional information of the specific object database related to representation of the set of properties of the first ontology entity type;

executing the set of functions using the specific object database;

returning a result of the executing in response to the set of calls, wherein the method is performed by one or more processors.

2. The computer-implemented method of claim 1, the set of functions including a filter that operates on an ontology entity type and returns a set of ontology entities of the ontology entity type.

3. The computer-implemented method of claim 1, the identifying being performed based on a certain mapping that associates the first ontology entity type with the first group of object databases and includes a transformation between the definition for the first ontology entity type and schemas for the first group of object databases.

4. The computer-implemented method of claim 1, a first object database of the first group of object databases being a relational database representing an ontology entity of the first ontology entity type as a row and properties of the ontology entity as columns, a second object database of the first group of object databases being a graph database representing the ontology entity as a node and links connected to the ontology entity as edges.

5. The computer-implemented method of claim 1, a first object database of the first group of object databases representing a particular property of the set of properties of the first ontology entity type in uncompressed or indexed form, a second object database of the first group of object databases representing the particular property in archived or encrypted form.

6. The computer-implemented method of claim 1, the selecting comprising matching the functional information of the specific object database with metadata of a particular function of the set of functions, the functional information indicating that a column of the specific object database allows random and near real-time access, the column corresponding to a property of the set of properties of the first ontology entity type.

7. The computer-implemented method of claim 1, the selecting comprising estimating a performance of each object database of the first group of object databases in serving a call to a particular function of the set of functions by limiting an amount of data to be returned from calling the particular function.

8. The computer-implemented method of claim 1, the selecting comprising confirming that the specific object database has a latest version of an ontology entity of the first ontology entity type that is available for querying.

9. The computer-implemented method of claim 1, the executing comprising:

accessing distinct object databases of the first group of object databases to access distinct properties of the first ontology entity type;

merging results of accessing the distinct object databases.

10. The computer-implemented method of claim 1, the executing comprising transforming data retrieved from the specific object database to data of the ontology.

11. The computer-implemented method of claim 1, further comprising:

identifying a user account associated with the set of calls;

verifying that the user account has permission to access the specific object database in executing the set of functions.

12. The computer-implemented method of claim 1, an ontology entity being an object or a link between two objects.

13. A system for managing versioning of providing a unified query interface across multiple object databases, comprising:

a memory;

one or more processors coupled to the memory and configured to perform:

receiving a set of calls of a set of functions in an API for querying an ontology, the ontology including a definition for each ontology entity type of a plurality of ontology entity types and a plurality of ontology entities instantiated from the plurality of ontology entity types, each ontology entity type of the plurality of ontology entity types having one or more properties;

determining a set of properties of a first ontology entity type of the plurality of ontology entity types, the set of properties to be accessed in executing the set of functions;

identifying a first group of object databases associated with the first ontology entity type, the first ontology entity type being represented in multiple forms separately in the first group of object databases;

selecting a specific object database from the first group of object databases based on functional information of the specific object database related to representation of the set of properties of the first ontology entity type;

executing the set of functions using the specific object database;

returning a result of the executing in response to the set of calls.

14. The system of claim 13, a first object database of the first group of object databases representing a particular property of the set of properties of the first ontology entity type in uncompressed or indexed form, a second object database of the first group of object databases representing the particular property in archived or encrypted form.

15. The system of claim 13, the selecting comprising matching the functional information of the specific object database with metadata of a particular function of the set of functions, the functional information indicating that a column of the specific object database allows random and near real-time access, the column corresponding to a property of the set of properties of the first ontology entity type.

16. The system of claim 13, the selecting comprising estimating a performance of each object database of the first group of object databases in serving a call to a particular function of the set of functions by limiting an amount of data to be returned from calling the particular function.

17. The system of claim 13, the selecting comprising confirming that the specific object database has a latest version of an ontology entity of the first ontology entity type that is available for querying.

18. The system of claim 13, the executing comprising:

accessing distinct object databases of the first group of object databases to access distinct properties of the first ontology entity type;

merging results of accessing the distinct object databases.

19. The system of claim 13, the one or more processors further configured to perform:

identifying a user account associated with the set of calls;

verifying that the user account has permission to access the specific object database in executing the set of functions.

20. A non-transitory, computer-readable storage medium storing one or more sequences of instructions which when executed cause one or more processors to perform:

receiving a set of calls of a set of functions in an API for querying an ontology, the ontology including a definition for each ontology entity type of a plurality of ontology entity types and a plurality of ontology entities instantiated from the plurality of ontology entity types, each ontology entity type of the plurality of ontology entity types having one or more properties;

determining a set of properties of a first ontology entity type of the plurality of ontology entity types, the set of properties to be accessed in executing the set of functions;

identifying a first group of object databases associated with the first ontology entity type, the first ontology entity type being represented in multiple forms separately in the first group of object databases;

selecting a specific object database from the first group of object databases based on functional information of the specific object database related to representation of the set of properties of the first ontology entity type;

executing the set of functions using the specific object database;

returning a result of the executing in response to the set of calls.

\* \* \* \* \*